(12) United States Patent
Seto et al.

(10) Patent No.: US 7,860,766 B2
(45) Date of Patent: Dec. 28, 2010

(54) CLOSING FUNDS MANAGEMENT SYSTEM

(75) Inventors: Mike Seto, Toronto (CA); Alison Judith Curtis, Toronto (CA); Dov Goldberg, Toronto (CA); Allan Shaver, Markham (CA)

(73) Assignee: Terant Enterprises Inc., Toronto, Ontario (CA)

( * ) Notice: Subject to any disclaimer, the term of this patent is extended or adjusted under 35 U.S.C. 154(b) by 1080 days.

(21) Appl. No.: 11/224,389

(22) Filed: Sep. 12, 2005

(65) Prior Publication Data

US 2007/0061270 A1    Mar. 15, 2007

(51) Int. Cl.
*G06Q 40/00* (2006.01)
(52) U.S. Cl. .......................................................... 705/35
(58) Field of Classification Search ............... 705/35–42
See application file for complete search history.

(56) References Cited

U.S. PATENT DOCUMENTS

| | | | |
|---|---|---|---|
| 6,711,554 B1* | 3/2004 | Salzmann et al. ............. | 705/64 |
| 6,898,577 B1 | 5/2005 | Johnson | |
| 7,085,735 B1* | 8/2006 | Hall et al. ..................... | 705/26 |
| 7,593,890 B1* | 9/2009 | Bradley et al. ................ | 705/38 |
| 7,747,519 B2* | 6/2010 | Kemper et al. ................ | 705/38 |
| 2002/0049624 A1* | 4/2002 | Raveis, Jr. ..................... | 705/8 |
| 2002/0082984 A1* | 6/2002 | Zappier ....................... | 705/38 |
| 2002/0138413 A1* | 9/2002 | Creamer et al. ............... | 705/38 |
| 2003/0033241 A1* | 2/2003 | Harari ......................... | 705/38 |
| 2003/0093371 A1 | 5/2003 | Wilson | |
| 2004/0064402 A1* | 4/2004 | Dreyer et al. ................ | 705/38 |
| 2004/0083164 A1* | 4/2004 | Schwartz et al. ............. | 705/38 |
| 2004/0167850 A1* | 8/2004 | Dreyer et al. ................ | 705/38 |
| 2005/0049961 A1* | 3/2005 | Hansen ........................ | 705/38 |
| 2005/0096996 A1* | 5/2005 | Hall et al. ..................... | 705/26 |
| 2005/0177510 A1* | 8/2005 | Hilt et al. ..................... | 705/40 |
| 2006/0036537 A1* | 2/2006 | Lawrence et al. ............. | 705/39 |
| 2006/0036540 A1* | 2/2006 | Lawrence et al. ............. | 705/39 |

OTHER PUBLICATIONS

Waters, Kathleen, "What is LVTS v. ACSS& why should you care?: Funds handling in an electronic environmenr, LawPro Magazine, Dec. 2004".*
Barkin, Ira, "YAre we Closed Yet? Y Some Tools to Solve New Challenges", Mondaq.com, Apr. 27, 2003.*
Jones, David. (Feb. 1993). Inter-bank funds transfer: Canadian banks to build large value payments system. Financial Technology International Bulletin, 10(6), 3.*
High speed money. (May 1999). CMA Management, 73(4), 24-27.*
"What is LVTS v. ACSS & why should you care?", © 2004 Lawyers' Professional Indemnity Company. Available at www.lawpro.ca/magazinearchives.
Manzer, Alison R., "Transaction Closing Process Using the Canadian Large Value Transfer System", Jan. 2005.

* cited by examiner

*Primary Examiner*—Ella Colbert
*Assistant Examiner*—Mohammad Z Shaikh
(74) *Attorney, Agent, or Firm*—Patterson & Sheridan, LLP

(57) ABSTRACT

The invention provides an electronic method of managing a timely and irrevocable transfer of closing funds between parties within a closed community of authenticated participants using an electronic interface accessible over a distributed network. A value transaction is negotiated and finalized between a first party and a second party. The invention allows payment of closing funds on a timely and irrevocable basis from a staging account.

36 Claims, 20 Drawing Sheets

CLOSING FUNDS MANAGEMENT SYSTEM

BACKGROUND OF THE INVENTION

1. Field of the Invention

The invention relates to electronic systems in support of commercial transactions, and, more particularly, to systems allowing electronic transfer of funds between parties.

2. Description of the Related Art

Many developments have occurred to allow commercial transactions to be negotiated and memorialized in electronic form. Various hallmarks of this evolution have included:

- word processing software, allowing agreements to be drafted and edited using electronic tools and electronic formatting;
- email and electronic communication in general, allowing parties and their legal representatives to negotiate terms of agreements and send drafts back and forth, even across time zones and at locations remote from each other; and
- contract management software and databases, allowing parties to keep track of the terms of the agreements that they have entered into.

With this technological evolution, there has also been a legal evolution. Today, in many jurisdictions, electronic signatures are recognized and have effect equivalent to paper signatures. Some legal agreements must be "registered" with government authorities such as real estate title documents. Electronic registration has become available in some jurisdictions. For instance, Teranet's e-Reg™ system in Ontario, Canada, provides an electronic land registration system in concert with the government land title authorities in that province.

In spite of these advances in converting aspects of commercial negotiation and agreements to electronic form, an area remains that is largely unconverted to electronic form—payment of closing funds for a commercial transaction.

Even deals that have been negotiated and memorialized electronically are frequently still "closed" using a variation of the age-old ritual of the face-to-face "closing" meeting, at which paper documents may be signed, and some physical object symbolic of the asset is exchanged physically for a paper cheque. The physical object may be a key (in the case of a real estate transaction), a share certificate, a title document, or some other symbolic totem. Paper cheques for large value transactions are usually in the form of certified cheques or bank drafts.

While attempts have been made to convert aspects of the "closing" to electronic form, these have largely consisted of systems for tracking lists of closing items, systems for electronically "managing" closing documents, or systems for electronically generating closing instructions for the various parties. No satisfactory attempt has been made to convert the funds transfer aspect of the closing process to electronic form.

There are several reasons that the funds transfer aspect has remained paper based:

- criticality of the timing aspect of the presentation of funds (which may be contingent on the quid pro quo exchange for the asset);
- need for an irrevocable form of tender demonstrating to the seller (or other payee) that the funds being presented are "good" and, once the system is instructed to transact, that the funds are not revocable at the insistence of the buyer or reversible by the financial institution;
- perception that cheques are a secure form of payment as at least one signature is required.

Wire payments and other forms of electronic payment are known but still considered "exotic" to many people. Also, there are aspects of existing electronic payment mechanisms that make these methods either unreliable or unsuitable for closing funds in most commercial transactions.

First, the timing of electronic payments cannot be controlled by the parties. Timing is usually only within the control of the financial institution settling the proceeds. Thus, there is no "finality" in the exchange as among the parties, nor is there predictability as to when the funds component of the exchange will be "final". This makes it virtually impossible to coordinate the seller's actual receipt of the funds with the buyer's taking possession and title of the item being sold, which are typically transferred as part of the act of exchange at the closing of the transaction.

Timing of existing electronic funds transfer has several variables. The authorization of the payment may be dependent on banking hours. The receipt of the funds is dependent on one or more banks' abilities to process the payment. Receipt could be earlier than the scheduled closing (placing the buyer at risk) or later than the scheduled closing (which is frustrating for both the buyer and seller, and may hold up, or unravel the closing altogether). While processing is occurring, the parties have no way of knowing how close the funds are to being delivered, increasing the perception of loss of control. These processing headaches are compounded where there are multiple payees of a deal, all expecting payment at a prearranged time (which may have a tolerance of variation of minutes or hours, rather than the multiple days it could take to get bank payment or until the bank payment is no longer revocable).

Second, the known forms of electronic payment (which have various levels of security) may be expensive to use, or difficult to access.

Third, payments may be revocable at different stages. This leaves open the possibility that a deal will fall through because the buyer or the buyer's bank stopped payment at a critical time, due to a failure of the paying financial institution or even days later based on banking rules. This is in addition to the risk that the funds may be "good" but simply not available at the closing time, which may occur for instance, in chain deals where the buyer from one deal is also the seller from another deal (very common in real estate transactions especially). Disadvantages of the various forms of electronic payments as closing funds are further elaborated in Alison R. Manzer, "Transaction Closing Process Using the Canadian Large Value Transfer System" Federated Press; Corporate Financing; Volume XI, No. 3, 2004, pages 702 to 712.

It is needed to provide a closing funds management system, in which an electronic method allows parties to manage a timed and irrevocable transfer of closing funds within a closed community of authenticated participants using an electronic interface accessible over a distributed network.

SUMMARY OF THE INVENTION

The present invention provides an electronic method of managing a timely and irrevocable transfer of closing funds in value transactions within a closed community of authenticated participants. The system allows pre-registration of entities wishing to participate as either a first party, second party or payee.

As used herein, "first party" is the seller or other offeror of goods/services to be exchanged for money. The "second party" is the purchaser or other receiver of the goods/services and the party paying the money. "Payee" refers to any entity that receives money under a transaction. As used herein, unless the context suggests otherwise, "payee" is inclusive of the "first party" as well as third parties to be paid under the transaction. It will be appreciated that any of the foregoing "parties" or "payees" may be a single individual, a corporation, a firm, a partnership, a government, a utility company or any other group of individuals or entities representing a side of or an interest in a transaction.

The method comprises the following steps:
a. providing an electronic interface accessible over a distributed network for a first party and a second party to enter information for a proposed value transaction between them, wherein the information includes an identification of a plurality of payees, including the first party;
b. allowing the first party and the second party to modify the information via the electronic interface until agreement can be reached between the first party and the second party on terms of the value transaction, the terms including a closing total, the closing total consisting of amounts payable to each of the plurality of payees;
c. providing access to a staging account electronically linked to the electronic interface into which the second party may electronically and irrevocably transfer closing funds representing the closing total;
d. allowing the first party and the second party to electronically signal via the electronic interface their final agreement as to the terms of the value transaction;
e. allowing the second party to electronically direct via the electronic interface that the closing funds in the staging account be released;
f. by signal from the electronic interface, electronically releasing the closing funds to be paid to the payees and electronically transferring in real time the amounts payable from the staging account to each of the payees; and
g. electronically notifying from the electronic interface at least the second party that the closing funds have been electronically transferred to the payees.

It will be understood that the phrase "electronically transferring" in reference to the closing funds can refer to two distinct situations:
1. first, "electronically transferring" may refer to an actual transfer of funds controlled by and accessible to the provider of the system;
2. second, "electronically transferring" may refer to an instruction or direction by the provider to a financial institution to process the actual funds transfer (electronically).

Both senses of the phrase "electronically transferring" are intended to be encompassed in the present disclosure. Banking legislation and other regulatory controls may prevent the provider from directly controlling or engaging in funds transfer in particular jurisdictions.

Step (g) may further comprise notifying each of the payees that a disbursement has been received from the second party with respect to the value transaction.

Note that the method provides for the funds being irrevocable at step (c) and for the irrevocability being time-limited if that is the preference of the parties. Preferably, the interface will allow for notification to the first and second parties when the funds are irrevocable or no longer irrevocable. The system is set up to interface with the chosen financial institutions of the parties. The parties are not bound to transact using one particular financial institution.

Note that the method provides for the funds being irrevocable as a result of step (f).

Note also that the funds transfer at step (f) is determined by the preferences of the parties. As explained further below, the mode of funds transfer can be selected by the parties to suit their (or the payees) preferences for cost, timeliness and trust status.

"Value transaction" refers to a transaction where goods and/or services are exchanged for money. "Commercial transaction" may be used interchangeably with "value transaction" herein, and does not imply any limitation as to the nature of the parties involved, the field of endeavour, or the type of goods and/or services exchanged. Although specific examples discussed in the present application may relate to real estate transactions, it is not intended to limit the present invention to such transactions.

Preferably, the first party and the second party are authenticated participants in the closed community. The authenticated participants may include lawyers or law firms representing parties in value transactions. The authenticated participants may also include financial institutions.

The payees may be authenticated participants, but wherein the payees (other than the first party) need not be authenticated participants to receive amounts under the method. It is however preferred that the payees be authenticated in order for the first and second parties to have confidence that they know with whom they are dealing.

Returning to the method set out above, step (a) of the method may further comprise allowing the first party to transmit an invitation to the second party to access the proposed value transaction information via the electronic interface. In this instance, the second party may need to accept the invitation in order to access the proposed value transaction information.

The funds transfer in step (c) is preferably via secure electronic payment from a bank account of the second party directly to the staging account. The funds transfer may be via wire payment. To illustrate one possible embodiment that has been found useful by the applicants, the funds transfer in step (c) may be via large-value transaction service (LVTS). LVTS is a payment system adopted by the Canadian Payment Association for funds transfers having large values. Using the LVTS system, the staging account bank receives a SWIFT message set MT103 record from the source bank signifying that good funds are being transferred. An extract from the MT103 record is communicated in a timely fashion to the system by means of the SOAP protocol (Simple Object Access Protocol). It would be obvious to persons skilled in the art that other means of transferring funds from the source bank to the staging account could be used, with the overriding consideration being that the messaging between banks must allow for a determination as to when the funds in the staging account are "good". While current implementations suggest that the MT103 message set (based on international SWIFT standard) is useful for this determination, other business rules and protocols could be adopted for other messaging systems without departing from the invention. It will be appreciated that references to "LVTS" throughout this disclosure should be read as including like forms of funds transfer.

Likewise, the funds transfer in step (f) is preferably via secure electronic payment from the staging account to a bank account of the payee. The funds transfer may be via wire payment (EFT). As a preferred embodiment, the funds transfer in step (f) is via large-value transaction service (LVTS). The parties are preferably able to specify the mode of transfer of the funds. The mode of transfer may also be governed by preference of the payee.

Note that the concept of 'funds transfer' includes electronically communicating a direction to a financial institution to transfer funds on behalf of a party.

Preferably, the notification to each payee contains certain indicative information, to enable the payee to identify the purpose of the transfer, and is controlled so as not to disclose sensitive or irrelevant information with respect to the parties or the value transaction.

The method preferably further includes a step before step (a) of receiving identifying information from the first party and the second party to enroll each of them as participants in the closed community of authenticated participants. The enrollment step may further include receiving and verifying authenticating information. At enrollment, participants may be asked to provide banking particulars. These banking particulars may be automatically verified by means of an automatic, electronic transfer of a nominal amount into a bank account designated by the participant seeking enrollment.

The possible types of value transactions supported by the present invention are many. For instance, the value transaction may be an asset purchase. One possible application of the method is for supporting closing of real estate transactions. The method may be particularly useful for real estate transactions where a closed community of real estate lawyers, banks and mortgage providers is regularly called upon to transact with each other. However, no limitation is intended or implied.

The method preferably allows the value transaction to be cancelled by either party at any of steps (a)-(d).

For enhanced security, the method preferably allows parties to signal their final agreement with the terms of the transaction by electronic signature. Various forms of electronic signature may be possible without departing from the method, however, it is preferred that the parties "sign-off" using a form of secure electronic signature or digital signature (PKI).

A financial institution may be able to access aspects of the electronic interface for monitoring value transactions involving its customers as payee or second party.

The method is preferably capable of supporting a plurality of value transactions having overlapping times and participants. Several features may be implemented to add efficiency to the method where multiple value transactions are being conducted with overlapping times and participants. Financial institutions acting on behalf of multiple second parties may be able to electronically transfer funds in bulk to the staging account for step (c) of multiple value transactions, the funds in bulk being separately attributed to individual value transactions awaiting payment. Further, financial institutions acting on behalf of multiple payees may be able to electronically receive amounts payable under multiple value transactions in bulk from the staging account, the funds in bulk being separately attributed to individual value transactions and amounts payable thereunder.

The participants themselves may be able to electronically access or receive reports or statements or ledgers summarizing status and amounts payable or receivable in multiple value transactions. Payees payable under multiple transactions may be able to electronically access or receive reports or statements or ledgers summarizing status and amounts receivable in multiple transactions.

The method is preferably capable of supporting a chain of value transactions in which the second party (buyer) of a first value transaction is the first party (seller) of a second value transaction, and wherein the first value transaction is coordinated so that the funds are available in the staging account to coincide with the second value transaction. That is, the funds for the first transaction attributable to the first seller are then automatically designated in the account for the second transaction.

The method may also further comprise electronically triggering a closing event coincident with release of the closing funds. For example, the closing event could comprise registration of a transfer of rights in an asset, such as an electronic registration of an ownership transfer in a land registration system. The funds direction may trigger the closing event or the closing event may trigger the funds direction, or they may be set to happen together. The closing event may be controlled through a program linked (such as by API) to the electronic interface.

Among many advantages, it will be appreciated that the foregoing method (and its various possible permutations) can provide:

- greatly enhanced timeliness of funds being available irrevocably to a payee; reducing or even eliminating the time until the funds can be used. In the example of a chain deal, this means eliminating the delay until the funds are available and able to be presented for the next deal in the chain. This allows more deals to be completed within a given day. In particular there is the elimination of the time traditionally utilized, for example, going to the payee's bank, depositing the proceeds of one deal, certifying a cheque for the next deal and couriering or otherwise transporting the cheque to the location of the next deal.
- a mechanism for the staging account operator to notify the participants once the funds are irrevocable;
- an enhanced degree of reliability to the second party that the first party funds have been placed in good funds and, where applicable, some assurance, where the first party's ability to fund the transaction is an indication of their ability and willingness to proceed with the transaction, that the first party is ready, willing and able to close (the proof that the first party had met their obligation to provide funds may be important should the deal not close and there be a dispute as to who is liable for the failure);
- a degree of assurance to both parties and payees, who may have an interest in the property based on indebtedness, that the agreed amount of proceeds to be paid will be paid, as (once delivered to the staging account and signed by both parties) the funds cannot be misdirected by either party;
- the ability for entities supplying funds (e.g. mortgagees) to directly attribute funds to specific transactions so as to ensure that funds will be applied to the intended transactions (as the invention allows the financial institution providing the mortgage, for example, to transfer the funds directly to the staging account, bypassing the agent (e.g. real estate lawyer), thus, avoiding the opportunity for misappropriation of funds by the agent or other intermediaries);
- the ability for the second party to designate the correct deal for its unmatched or mis-matched funds via an interface;
- the ability to automatically return unmatched or mis-matched funds to the source financial institution, unless otherwise designated by the second party.
- the benefits of a closed community of transaction participants, who have been previously registered and authenticated and whose banking information may also be authenticated (the account information may be verified by automatically transferring into the newly registered participant's designated bank account a nominal amount of funds);
- a means of bridging and avoiding potential data entry errors by augmenting the accuracy of the target of a closing payment, by providing for selection of payees by name (rather than by bank account number);

an enhanced protection of confidential banking information by not requiring first and second parties to locate and accurately record banking information (and allowing the receiver of the funds to be selected from lists of participants linked in the system with known banking information, without revealing the banking information to the other participants);

an authentication and verification that participants have prima facie authority to participate and that the reason for their participation is proper;

a control for proper maintenance of beneficial interest in the funds until the parties' desired moment of exchange;

the ability for an external computer system or user (for instance, through an API) to directly invoke the transfer of funds;

the ability to allow funds allocated to a deal to be "frozen" for a specified period of time to prevent the funds from being reallocated or misappropriated after the parties have signed off on the transaction but before executing the transaction (and a like ability to "unfreeze" the funds should the parties mutually agree not to proceed with the transaction); and reduced bank fees while maintaining irrevocability of funds in chain deals due to funds being maintained in the system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A preferred embodiment of the method will now be illustrated having regard to the attached figures.

Figure 1:
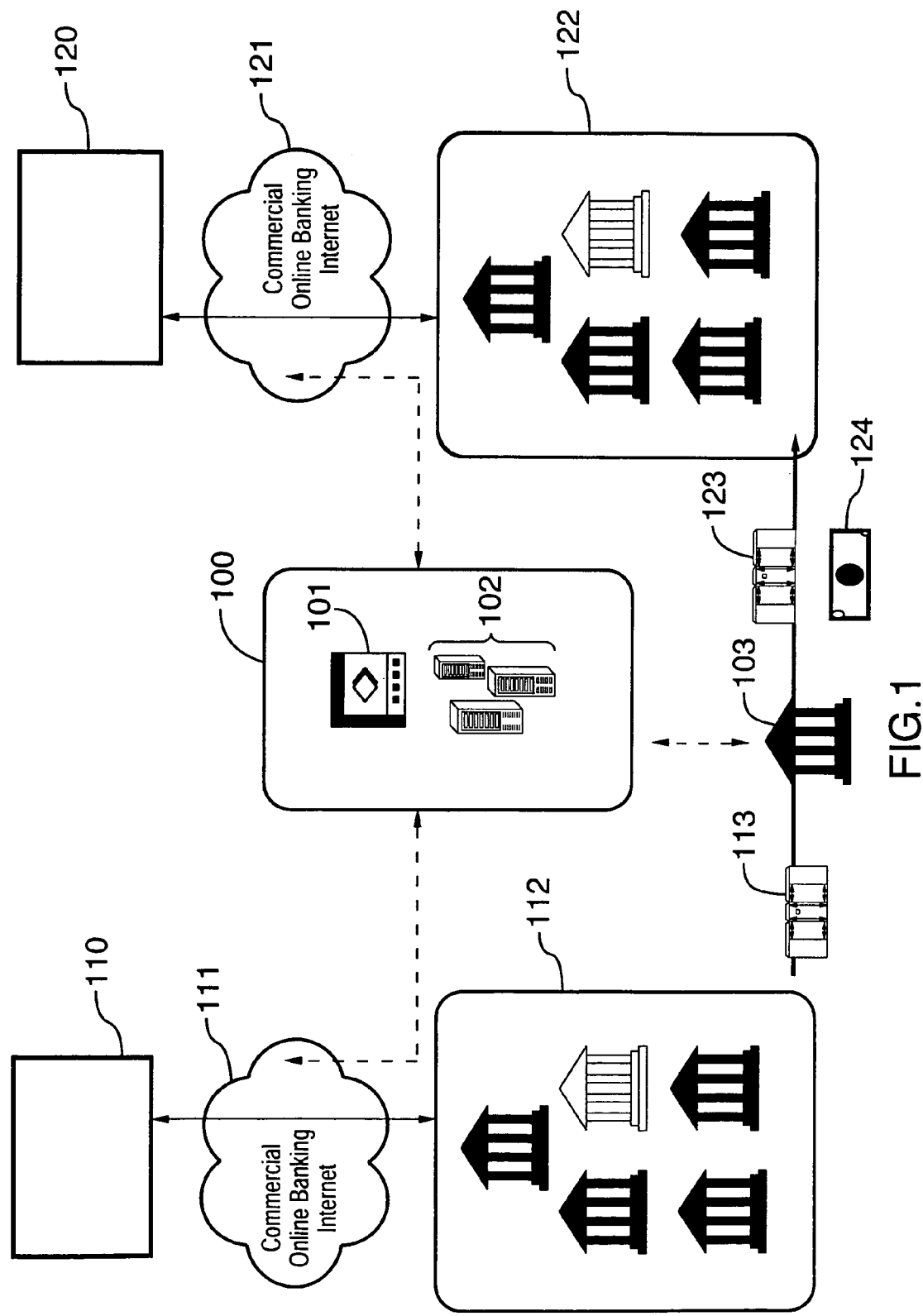
FIG. 1 shows a network diagram of the preferred embodiment of the system according to the method.

FIG. 1 shows a network diagram of the simplest embodiment of the invention. The closing funds management system 100 includes an electronic interface 101 which is accessible to participants as a secure online service via servers 102.

The "first party" (here, the seller) is generally illustrated at 120. The first party 120 is preferably enabled to access commercial online banking 121 linked to the party's regular bank account at one of many banks 122. The terms "seller" and "vendor" are used in this Detailed Description as inclusive of the seller/vendor's legal representatives.

The "second party" (here, the buyer) is generally illustrated at 110. The second party 110 is preferably enabled to access commercial online banking 111 linked to the party's regular bank account at one of many banks 112. The terms "buyer" and "purchaser" are used in this Detailed Description as inclusive of the buyer/purchaser's legal representatives.

As shown in FIG. 1, the system 100 enables closing funds to flow from the second party 110 to the first party 120 using a staging account 103 linked to the system 100. The funds are directed by the second party 110 and flow from the party's bank 112 via a secure electronic funds transfer (shown here as LVTS) to the staging account 103. Once the transaction is negotiated and "closed" through the system 100 (via interface 101), the funds for the closing are automatically (and electronically) disbursed from the staging account 103 direct to the bank account of payees (including, as illustrated, the first party's account at bank 122). The use of LVTS 113 is preferred, at least in the payment into the staging account, as it means that good funds are immediately available in the staging account and ready for settlement at the prearranged closing time. In the payment out of the staging account, LVTS 123 may also be used to provide seamless and secure movement of good funds with immediate benefit for the first party. Otherwise, if the parties are agreeable, some less secure form of electronic payment out may be considered acceptable (such as wire payment (EFT) 124).

Figure 2:
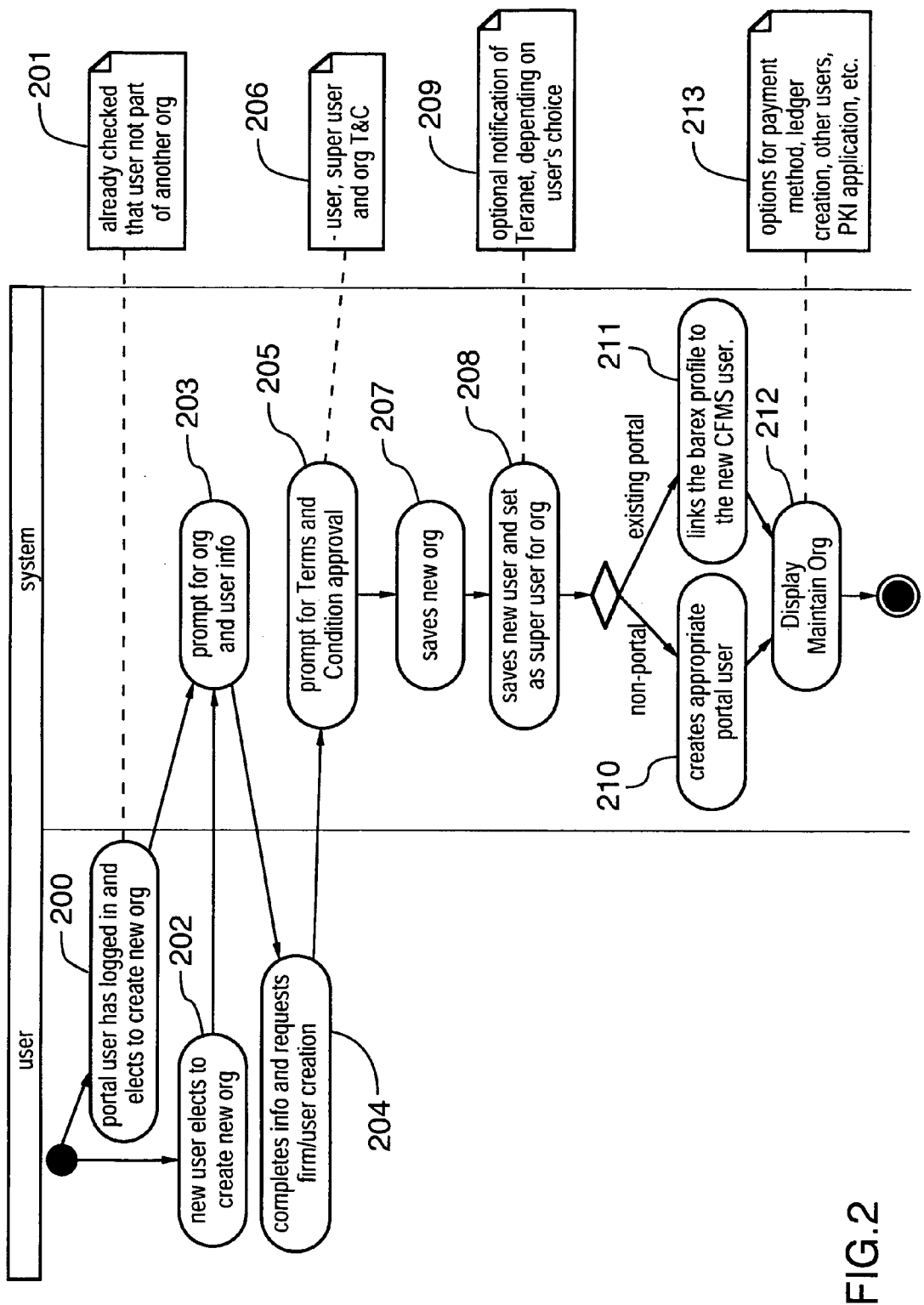
FIG. 2 shows a flow diagram of the enrollment process according to the preferred embodiment.

The participants in the system are preferably part of a "closed community" of participants. By "closed community" it is simply meant that the parties have gone through some form of enrolment or registration and authentication process, so that at least some information is known about them and some level of authenticity or familiarity may be presumed. The preferred enrolment workflow through the system 100 is shown in FIG. 2. A new "user" or prospective participant may have logged in through some related website 200 or may have come directly to the enrolment website as a new user 202. The system may check to see whether the new user is part of an existing "org" (organization) 201 already enrolled in the system (e.g. a new lawyer user comes to the site and may not be aware that his/her law firm is already registered as an "org" on the system). If a new "org" is to be created, the system collects that information via prompts 203. If a new "user" is to be defined in an existing "org", the system may collect that information instead 204. An "org" may have one user that is in charge of providing and maintaining information with respect to its "org" status. That user may be a "super user" as at 206. The system may present various information screens at the enrolment stage. For instance, terms and conditions for use of the system may be presented for approval 205. Once the new "org" is saved 207, and the "new user" and "super user" information is confirmed in the system 208, the system may allow other information to be added to or linked to the "org" and/or the "user" profile. For instance, a lawyer joining the system may have the option to link 211 (or provide 210) his/her lawyer profile information (e.g. as maintained by another portal or utility for lawyers). At this point in the enrolment process, information specific to the closing funds management system may also be obtained from the user 212 (stored in the system as his/her preferred options for payment method, ledger creation, other users, PKI application, etc. 213). Payees will preferably specify the manner by which they wish to receive payments as part of the enrolment process. As one step in the enrolment process, when a bank account is provided by the user, the system automatically makes an EFT payment (of a nominal amount of good funds) to the account specified by the user (which will typically be sent at close of day along with other EFT instructions). The user's account is created, but no funds activities can be initiated by that user until confirmation of receipt of the test funds (typically upon login the following day).

In addition to self enrolment the new participant is authenticated prior to being activated. In the preferred implementation, authentication is by the established procedures of a certificate authority (not shown).

Figure 3:
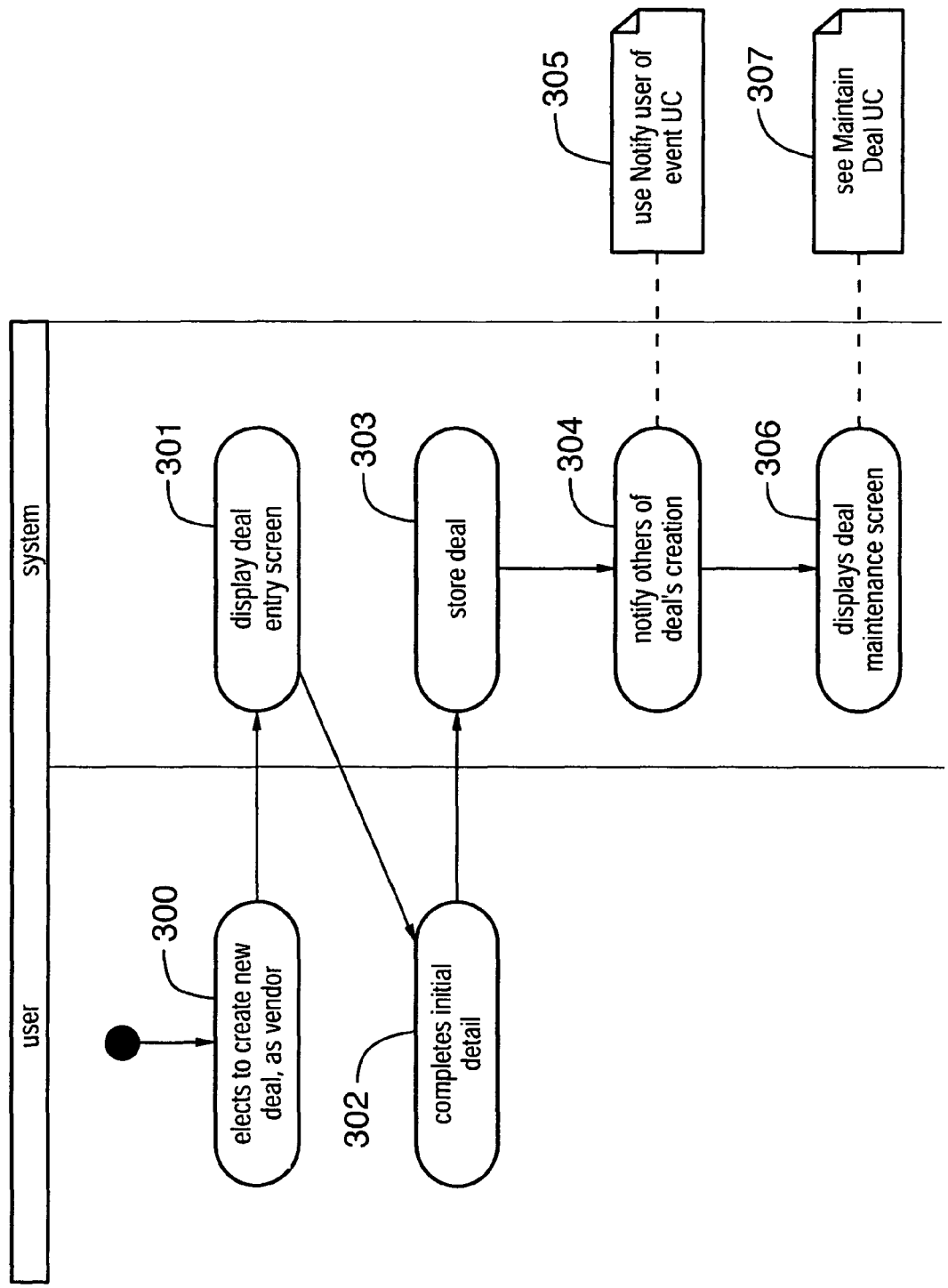
FIG. 3 shows a flow diagram of the deal creation process according to the preferred embodiment.

Turning to FIG. 3, the workflow is shown for a first party to create a deal (transaction) in the system. (Note that while the preferred embodiment is for the first party to start the process of creating a deal, which the second party "joins" and can modify later, the system can also be tailored to allow the second party to start the deal, or for both parties to create the deal together.)

The user (in this case the first party) elects to create a new deal (as vendor) 300. The user completes initial detail 302 in the deal entry screen 301 displayed via the electronic interface. This deal information is then stored 303. In the information about the deal provided by the first party, the other party (or parties) to the transaction are specified and the system will automatically notify these others of the creation of the deal 304, 305. The deal information can be maintained or updated as needed 306, 307.

Figure 4A:
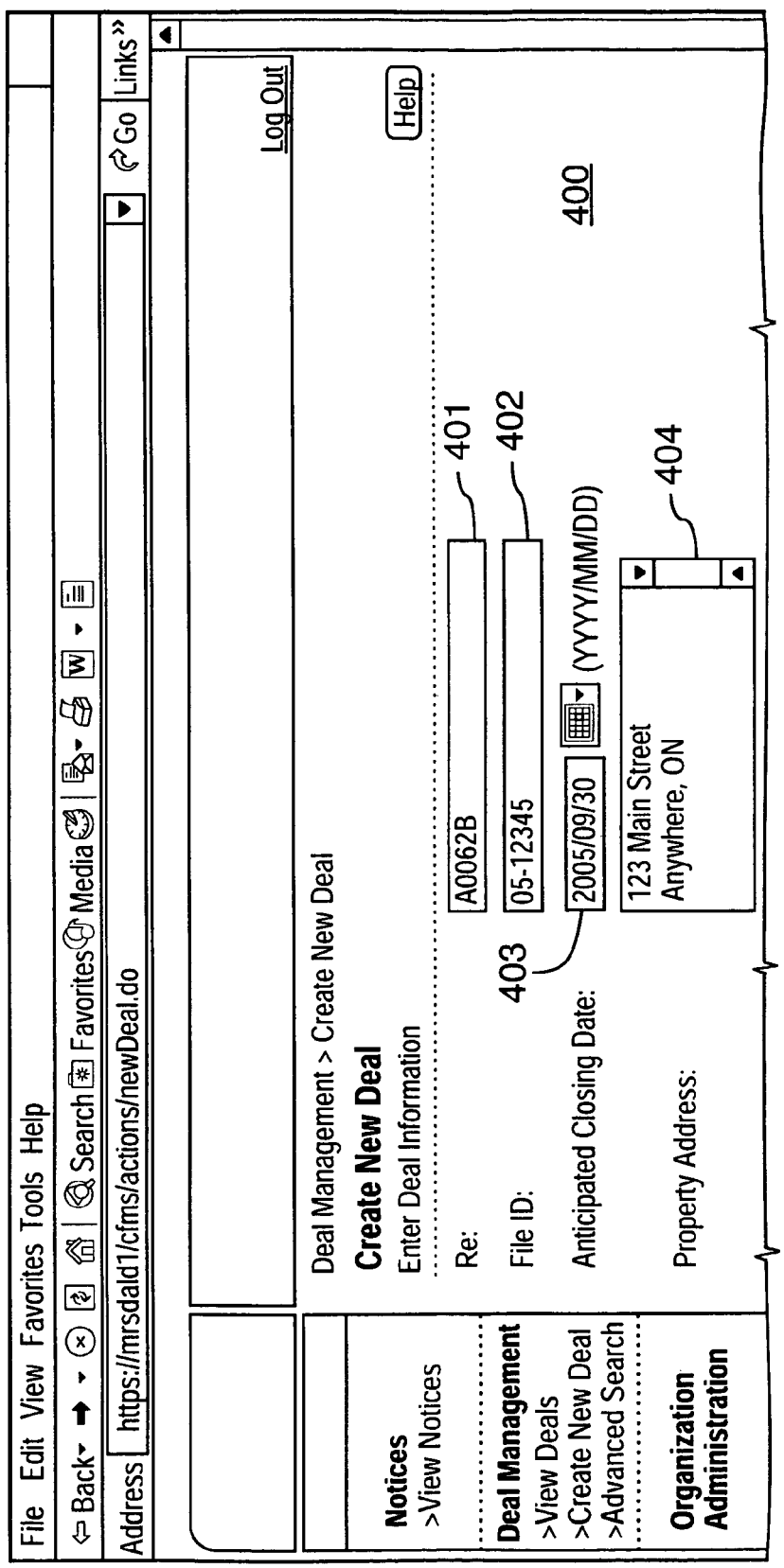
FIG. 4 shows an exemplary screen shot of the deal creation process.
Figure 4B:
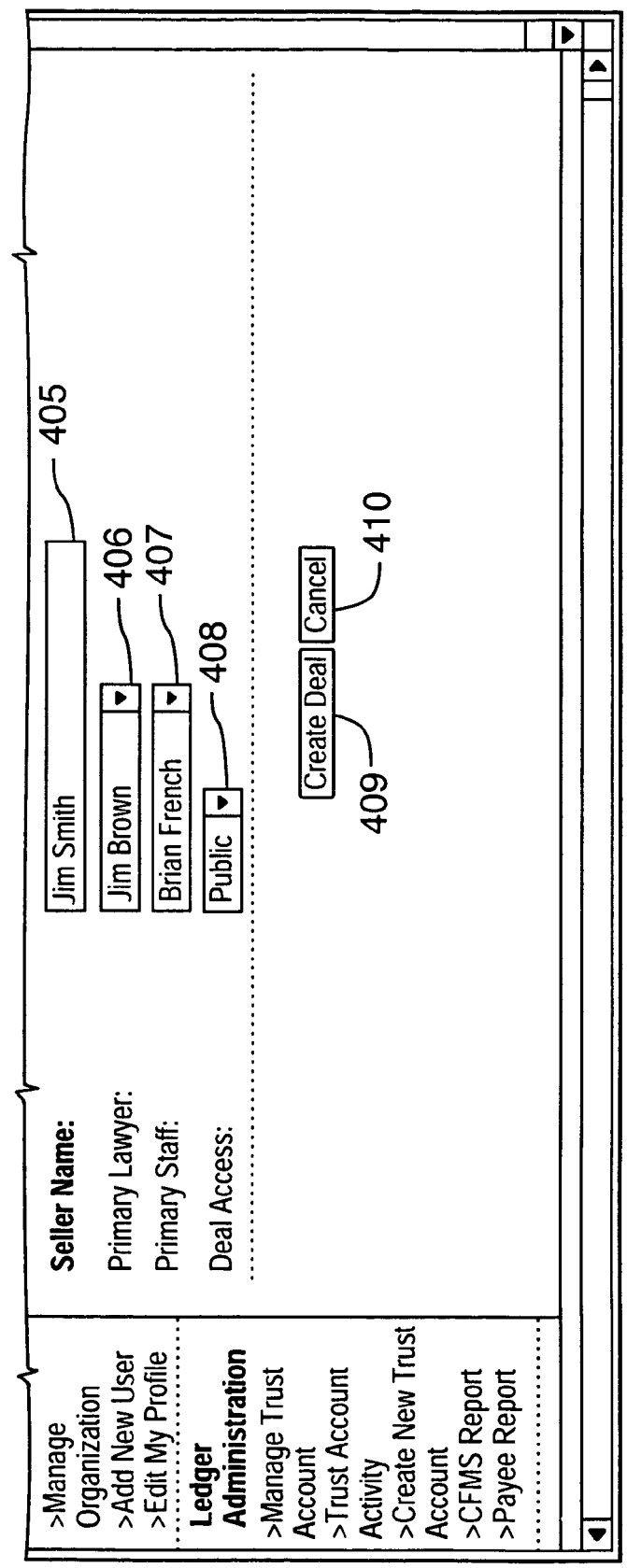

As an illustration, a sample screen shot of one possible new deal screen 400 is shown in FIG. 4. As shown, the information entered includes a "Re" line 401 (for the party to identify the deal, a "File ID" 402 (for the party to provide a client or matter number). This is a convenience especially to law firm users of the system which may use the File ID to track activities for multiple clients or deals. The user also enters an anticipated closing date 403. The closing date 403 may be selected from a calendar display to encourage accurate entry. At this stage, the closing date is simply based on provisional approximation as to the intended closing. This is not locked in. This data may also be used in the aggregate to allow for planning as to volume and amounts that could be closing, to allow both the operator of the system and the financial institution that maintains the staging account to ensure straight through processing.

The screen shot illustrates a possible embodiment for real estate transactions. Therefore, the identification of the address of the property being sold is entered 404. In other types of transactions, the field might ask for another kind of control or identifying information, such as number and type of shares (in the event of a share transaction).

The seller name is entered 405, and, in this case the seller's lawyer and "primary staff" person are entered, or preferably selected, at 406, 407. "Deal access" 408 refers to the level of access permitted to individuals in the same organization. The default access level is full access to all persons in the same organization. However, this may be customized for "private" access (access limited to just the primary lawyer, primary staff person and "super user"). Such private access may be desirable for users in situations where a firm has a "Chinese wall" preventing communication on certain matters between members of the same firm, to avoid appearance of conflict of interest. One of the advantages of a "closed community" is that the participants are already known and linked to identifying information. Selecting parties from drop-down lists allows for more efficient data entry (re-using data already in the system that may be pre-verified and authenticated). Such data may also be (to a certain extent) re-usable from profile information entered in a related portal.

Once the initial deal information is entered, the user clicks to "create deal" 409 (or cancel 410). The deal is then given an identifying number by the system (not shown in FIG. 4).

Figure 5:
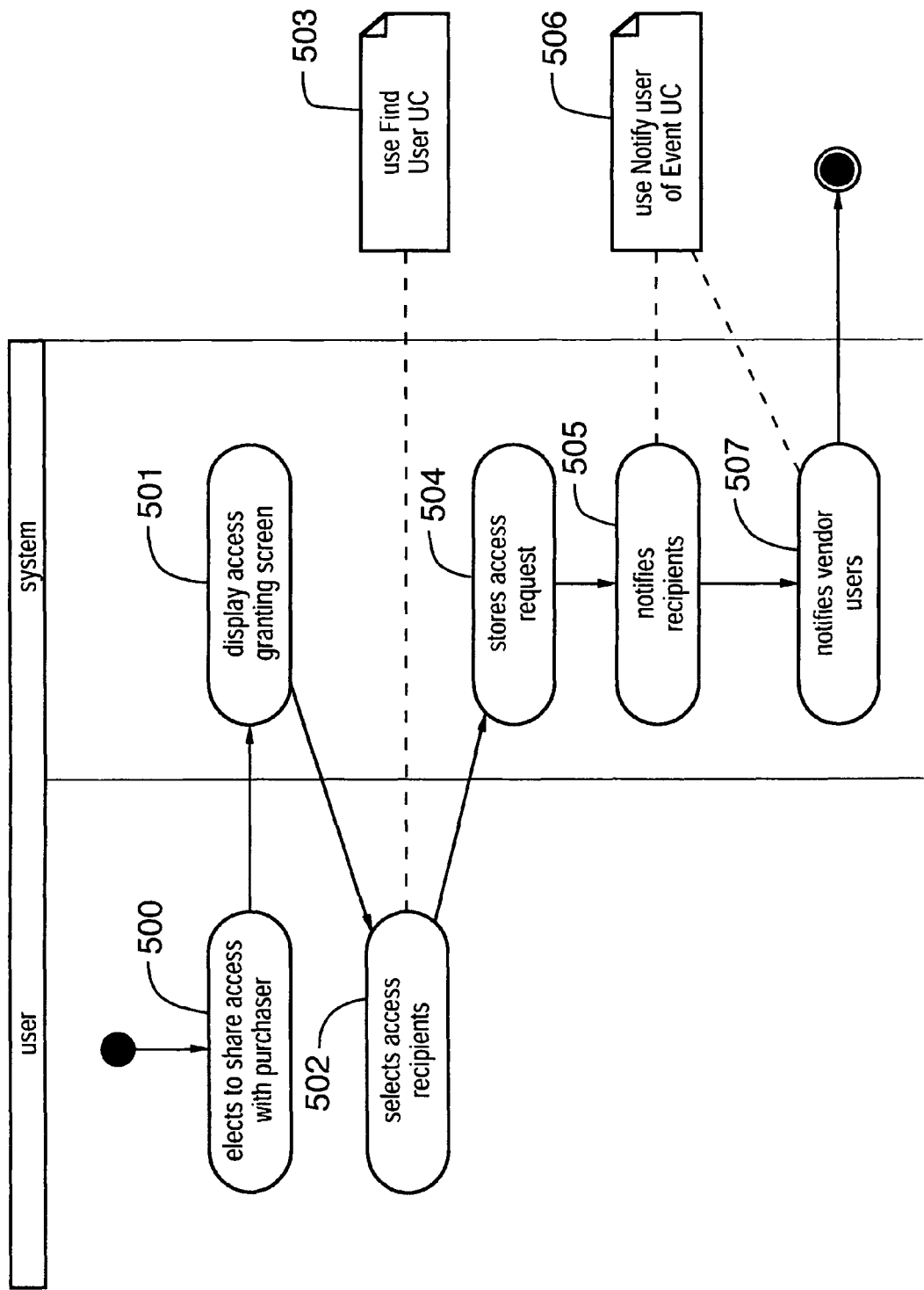
FIG. 5 shows a flow diagram of the process for sharing a deal with a purchaser (second party).

So far, the deal is entirely built around the seller and the property itself. To bring the buyer/purchaser into the deal, the purchaser is preferably invited to "share access" to the deal, which is shown in the work flow diagram in FIG. 5. The seller/seller's lawyer/identified staff elects to share the deal with a purchaser 500. From the access granting screen 501, the name of the purchaser's lawyer is queried 502 (the system uses "Find User" 503 to relate the query to names of enrolled users and "orgs"). If multiple names are possible matches, the system prompts for a selection 502, and the selected recipient is notified 505, 506 if the deal that has been opened and invited to access the deal. The vendor/seller is also notified that the invitation has gone out to the purchaser 507.

Figure 6A:
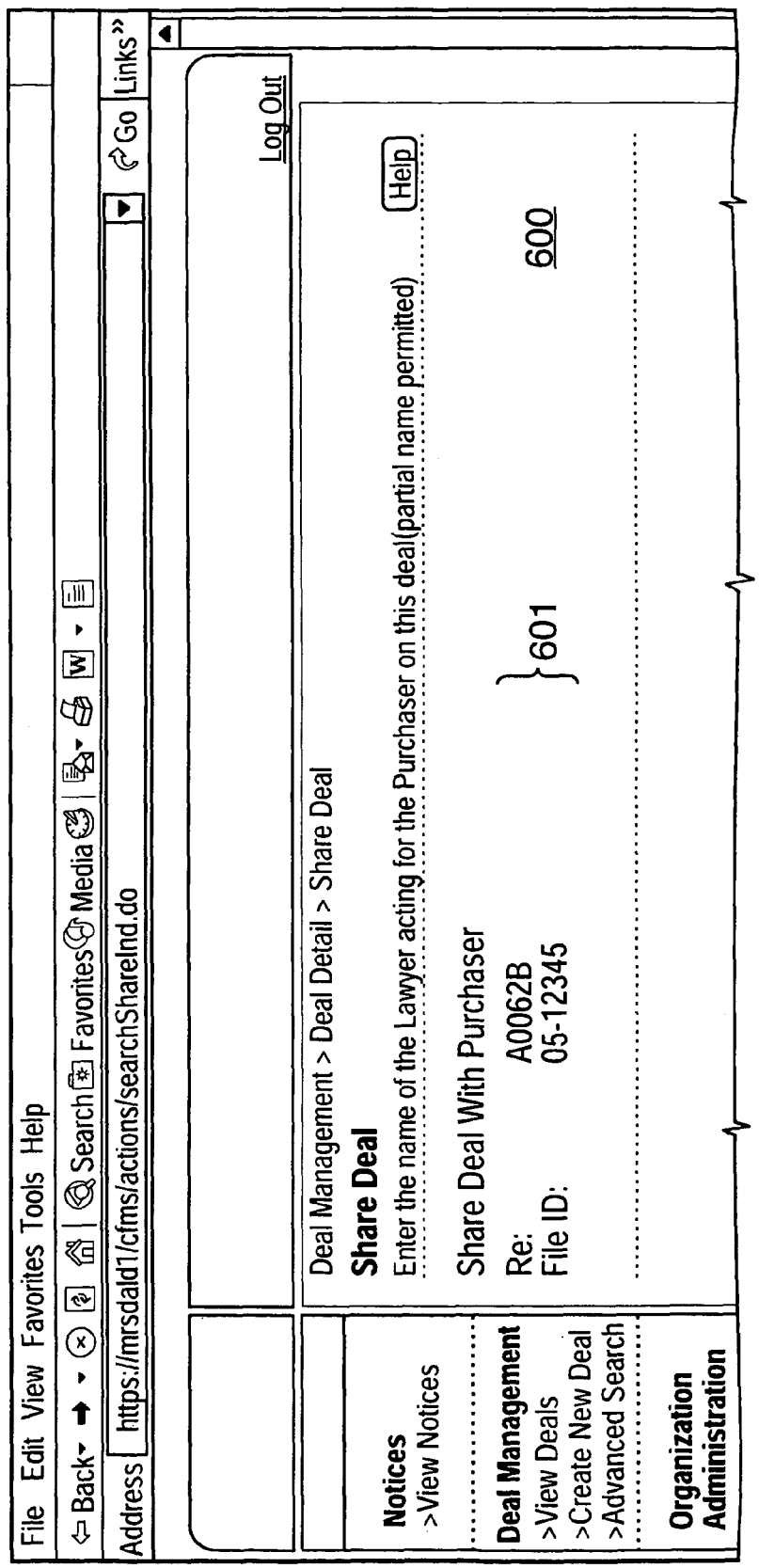
FIG. 6 shows an exemplary screen shot of the deal sharing process.
Figure 6B:
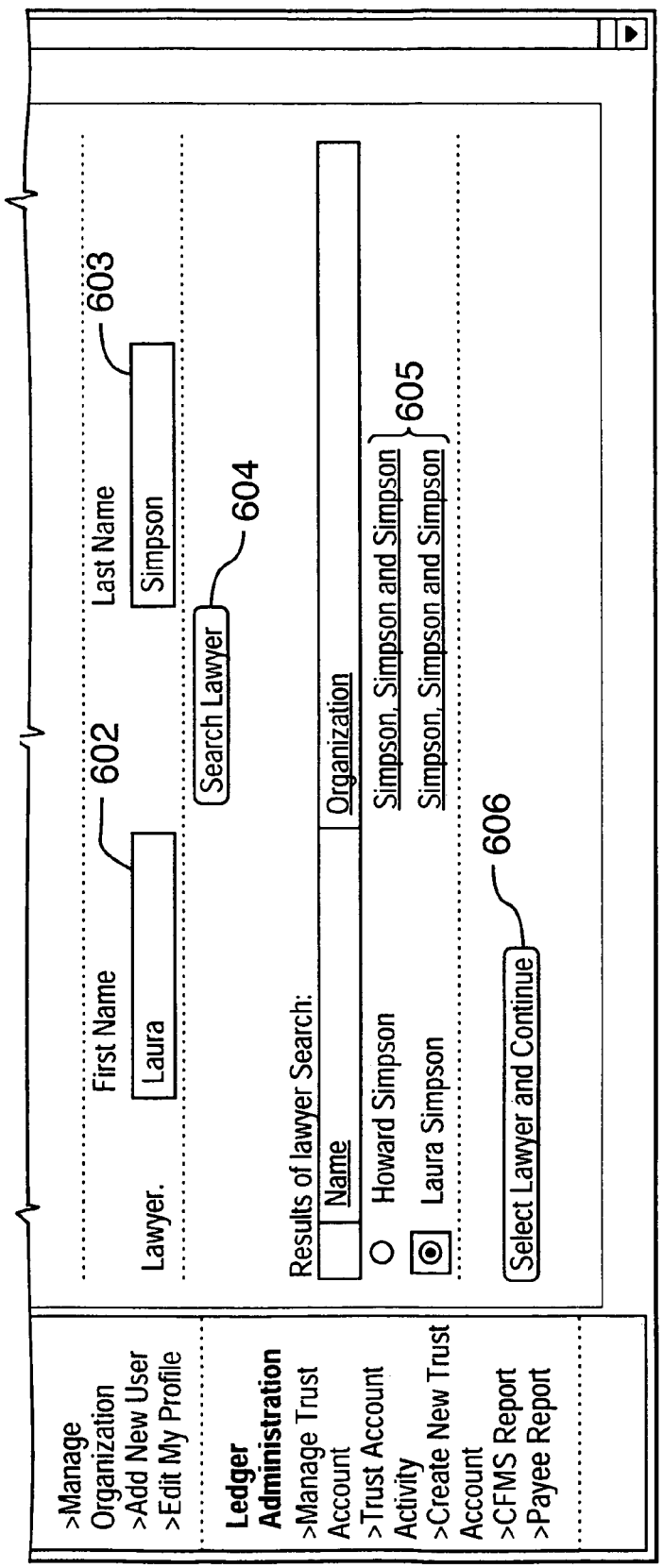

This is illustrated in the sample screen shot 600 in FIG. 6. The top of the screen shows the deal identifying information 601, including the deal number assigned by the system. The buyer/purchaser's lawyer is entered in the query boxes 602, 603, and the possible matches are shown in the search results section 605. The correct name of the buyer/purchaser's lawyer is then selected (radio buttons shown). By clicking 606, the notice is directed to be sent to the selected individual. Alternatively, the choices could be to select an organization (without individuals named) and the organization itself could be notified.

Figure 7A:
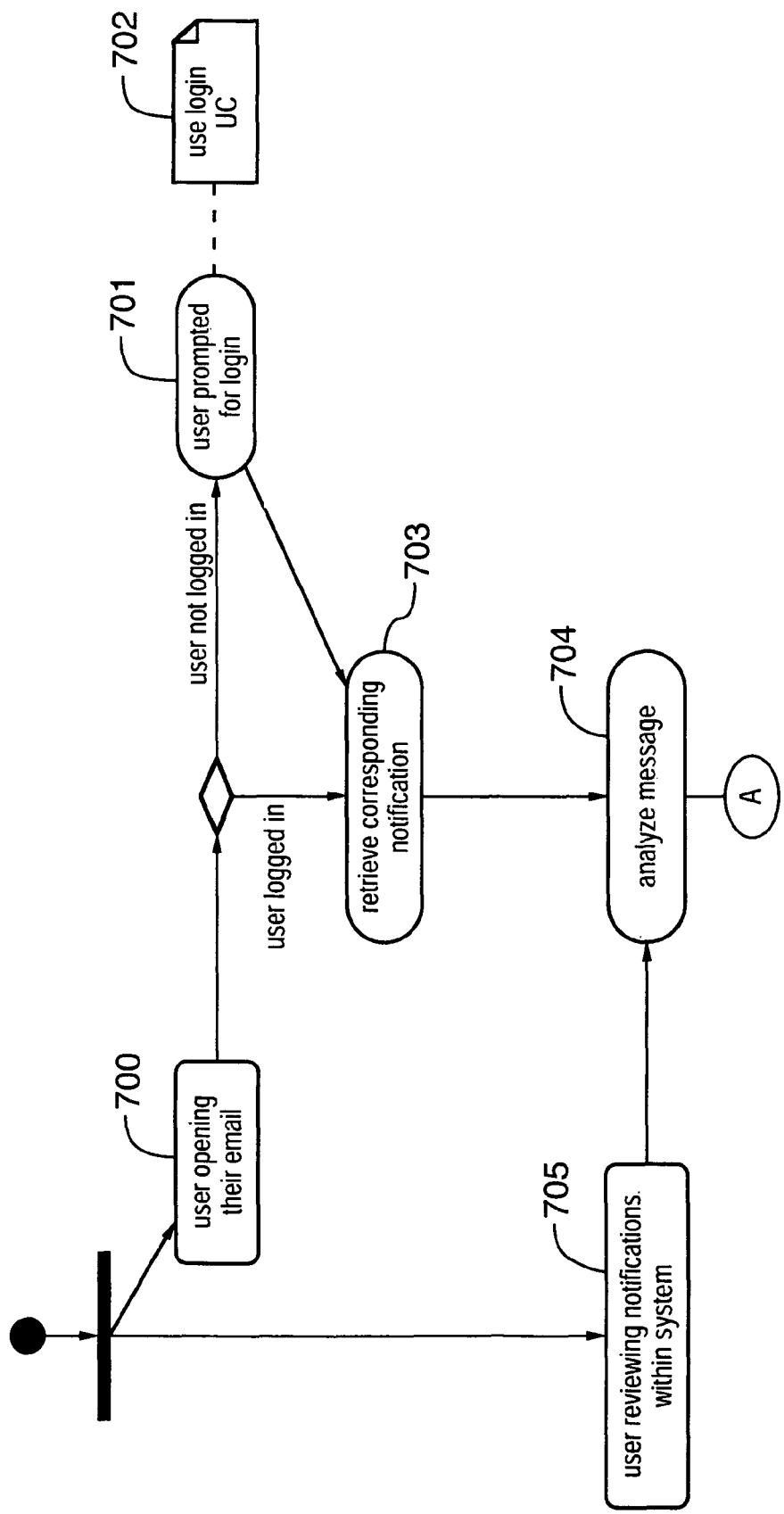
FIGS. 7A and 7B show flow diagrams of the process for accepting a deal.

The ball is now in the buyer/purchaser's court. Beginning at FIG. 7A, the workflow is shown for the buyer/purchaser to come into the deal and change or accept the information. After receiving the invitation (by email, in this case) 700, the buyer/purchaser is prompted for login 701 and is then able to retrieve notifications in the system 703, 704, 705, 703 and 705 refer to notifications of the deal particulars, allowing the purchaser to determine that he/she is properly named as the purchasing party to the deal. 703 refers to access through an email message, while 705 refers to access to information from within the application.

Figure 7B:
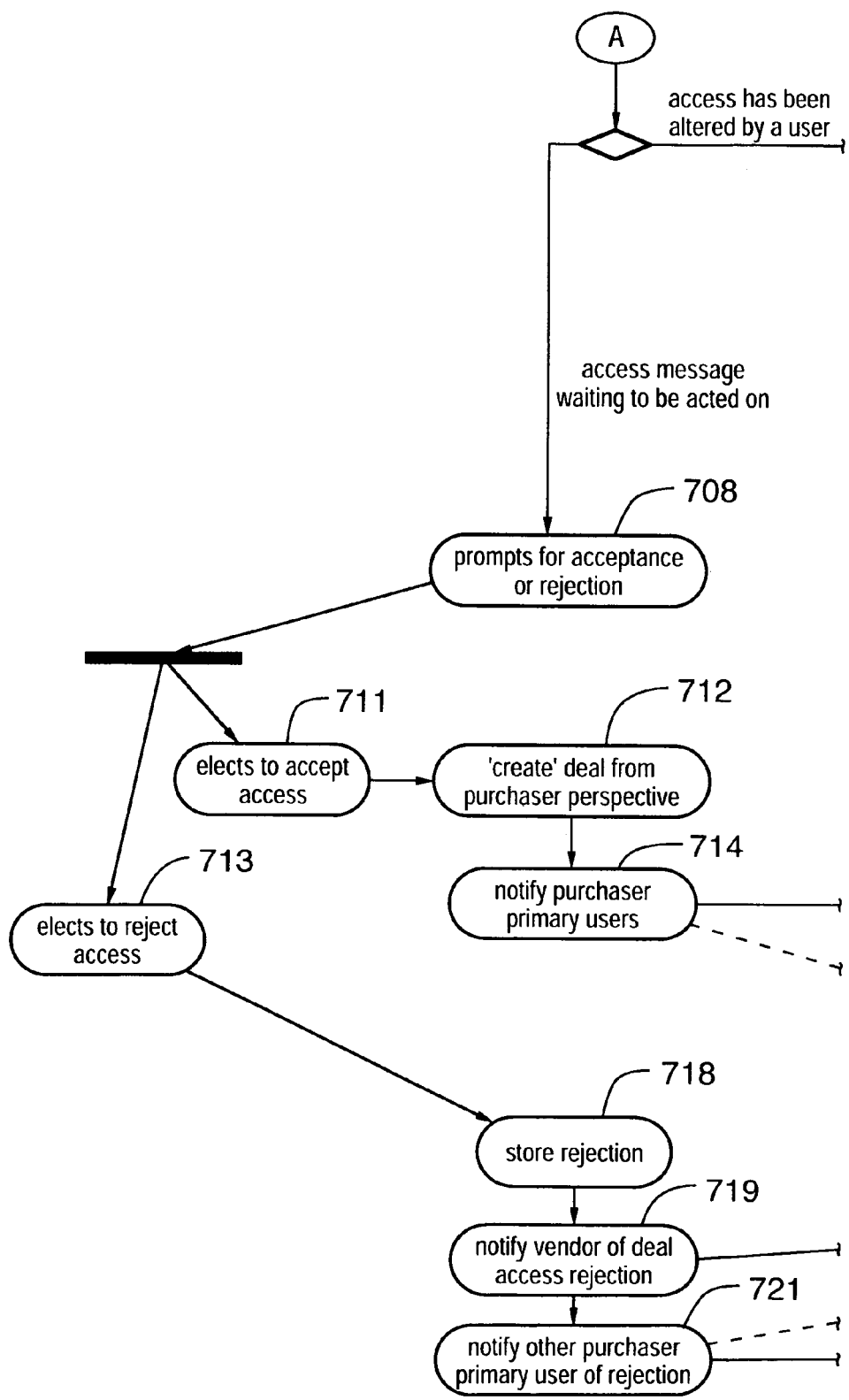
Figure 7C:
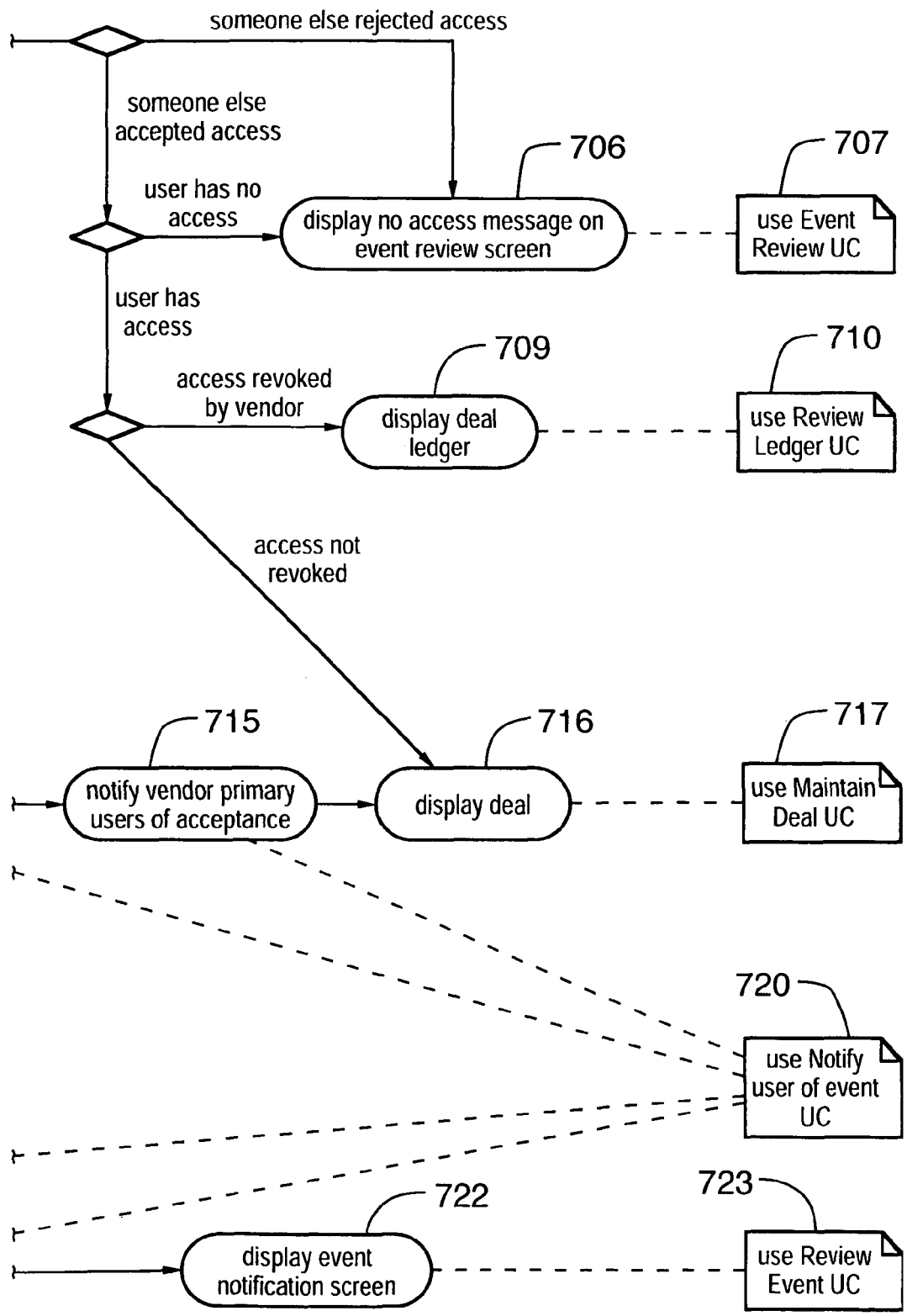

The top parts of FIG. 7B refer to exception situations where the invitation may have been accepted or rejected (or revoked) before the user acts on the notification. The notification is preferably sent to both the primary lawyer and the primary support person. The flow defines the user's access to the deal (if accepted or rejected).

Once the access is confirmed 711, the buyer/purchaser can then enter the deal and insert new information or change information in the existing deal created by the seller/vendor 712. Changes are notified to the primary users designated by the purchaser and the vendor 714, 715, and the deal as it stands is available for further changes 716.

As shown in the bottom steps of FIG. 7B, the buyer/purchaser, after review of the initial information on the deal, can "reject" the access, thereby indicating to the seller/vendor that either the information entered is incorrect, or that the buyer/purchaser does not want to enter into this deal. The steps 713, 718, 719, 720, 721, 722, 723 will be triggered, as one example, if the purchaser is erroneously selected as a party, or, as another example, if there is a change in counsel before acceptance of the invitation, or if the purchaser has declined to use the system for closing the transaction.

Figure 8A:
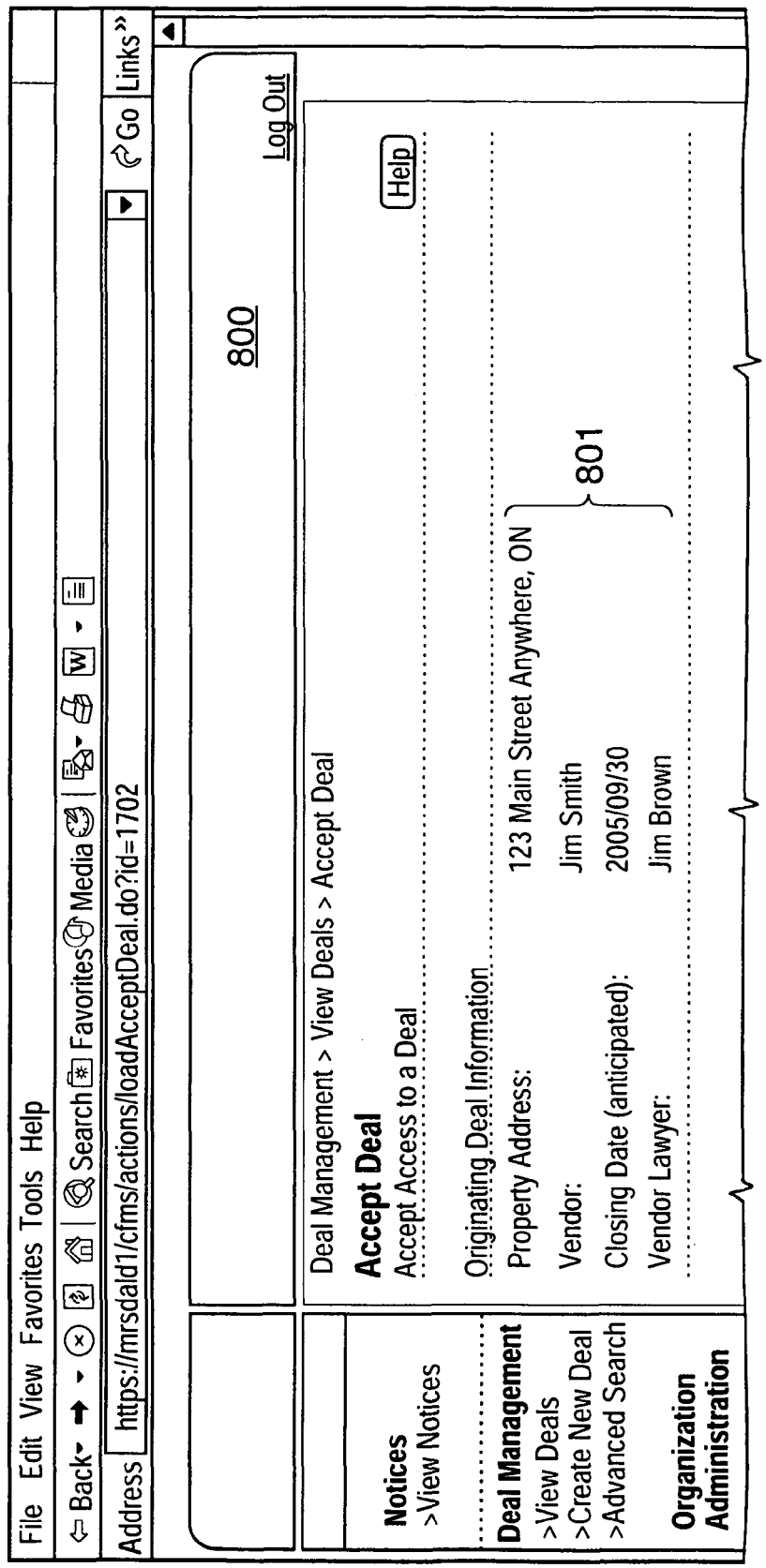
FIG. 8 shows an exemplary screen shot of the deal acceptance process.
Figure 8B:
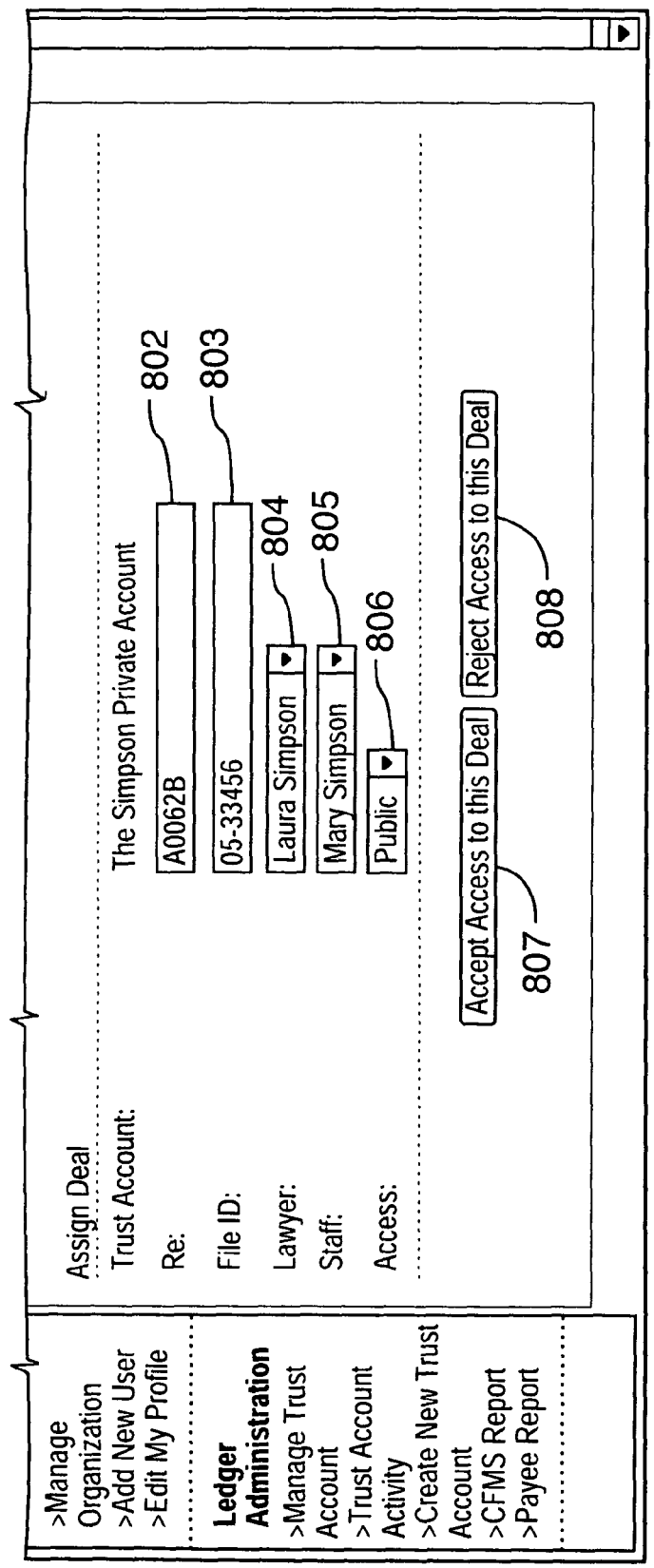

Turning to FIG. 8, a sample screen shot is shown of the accept access workflow 800. When the prospective buyer/purchaser is invited to the deal by the seller/vendor, the buyer/purchaser is able to see the information about the deal that has already been entered by the seller/vendor 801. The buyer/purchaser then can enter its own deal identification information (Re line 802 and file ID 803), and designate its own lawyer and primary staff person 805, 806. The access terms are also set by the buyer/purchaser 806.

The buyer/purchaser then clicks to "accept" access to the deal. (If "reject" access 808 is clicked, this has the effect of recording within the system a rejection with notification to the vendor of the rejection. This will necessitate activity on the part of the vendor outside the system to determine the reason for rejection and take corrective action if appropriate.

Figure 9A:
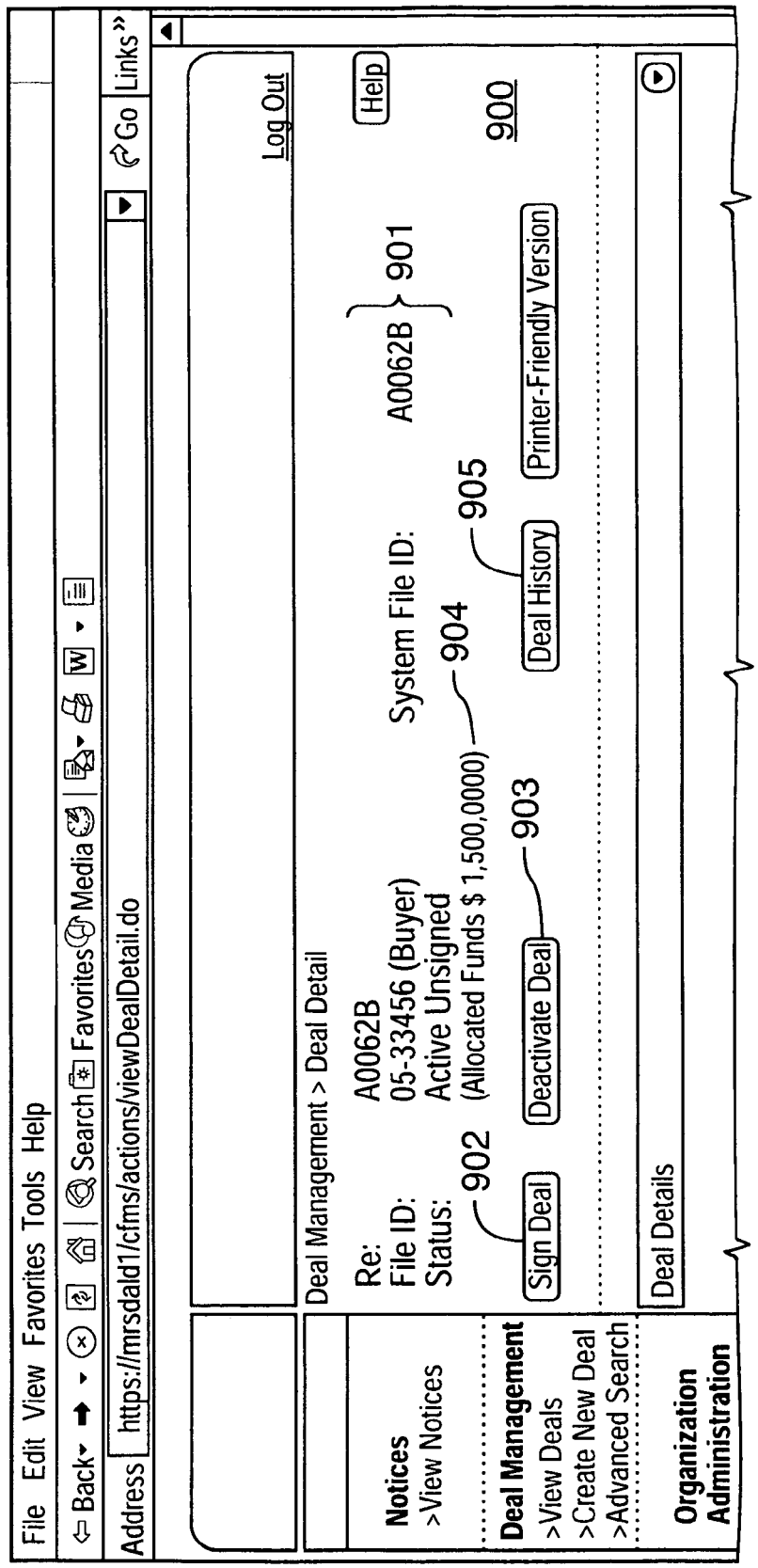
FIG. 9 shows an exemplary screen shot of funds deposited (purchaser view).
Figure 9B:

At FIG. 9, a sample screen shot is shown of the funds deposited workflow 900. This screen would be visible if the buyer/purchaser has opted to view a pending deal after funds have been deposited to the staging account before the expected closing. The buyer/purchaser's deal information is shown at the top of the screen 901, including the neutral "file ID" that is assigned to the deal by the system. The top information bar also shows the funds that have been allocated for the deal (in this case, $1,500,000) 904. Other deal details are shown in 906 (property address, closing date), 907 (buyer representatives) and 908 (seller representatives).

The bottom of the screen shows payee details 909, 910. The payees are designated elsewhere (not shown) and this summary simply shows which payees have been designated and whether they have been paid as yet. In this example, a payee has been designated as the vendor lawyer. This would typically represent the sale proceeds that would be directed to the vendor's trust account for distribution to the vendor him/herself at closing.

The screen also includes options to allow the purchaser to "sign" the deal 902, deactivate the deal 903, or retrieve the deal history 905. 902 prompts the lawyer to sign using his/her digital signature, preferably by means of PKI credentials. This has the effect of confirming that the party agrees to the amounts and designated payees entered for the deal. Deactivation of the deal 903 will typically be used if the deal is not going to close (i.e. agreement could not be reached or the conditions could not be met) and thus the deal in the system should be cancelled (or the file should be "closed"). 905 will take the user to a screen displaying the history of the deal (specifically displaying funds and signing activities relating to the deal.

Figure 10A:
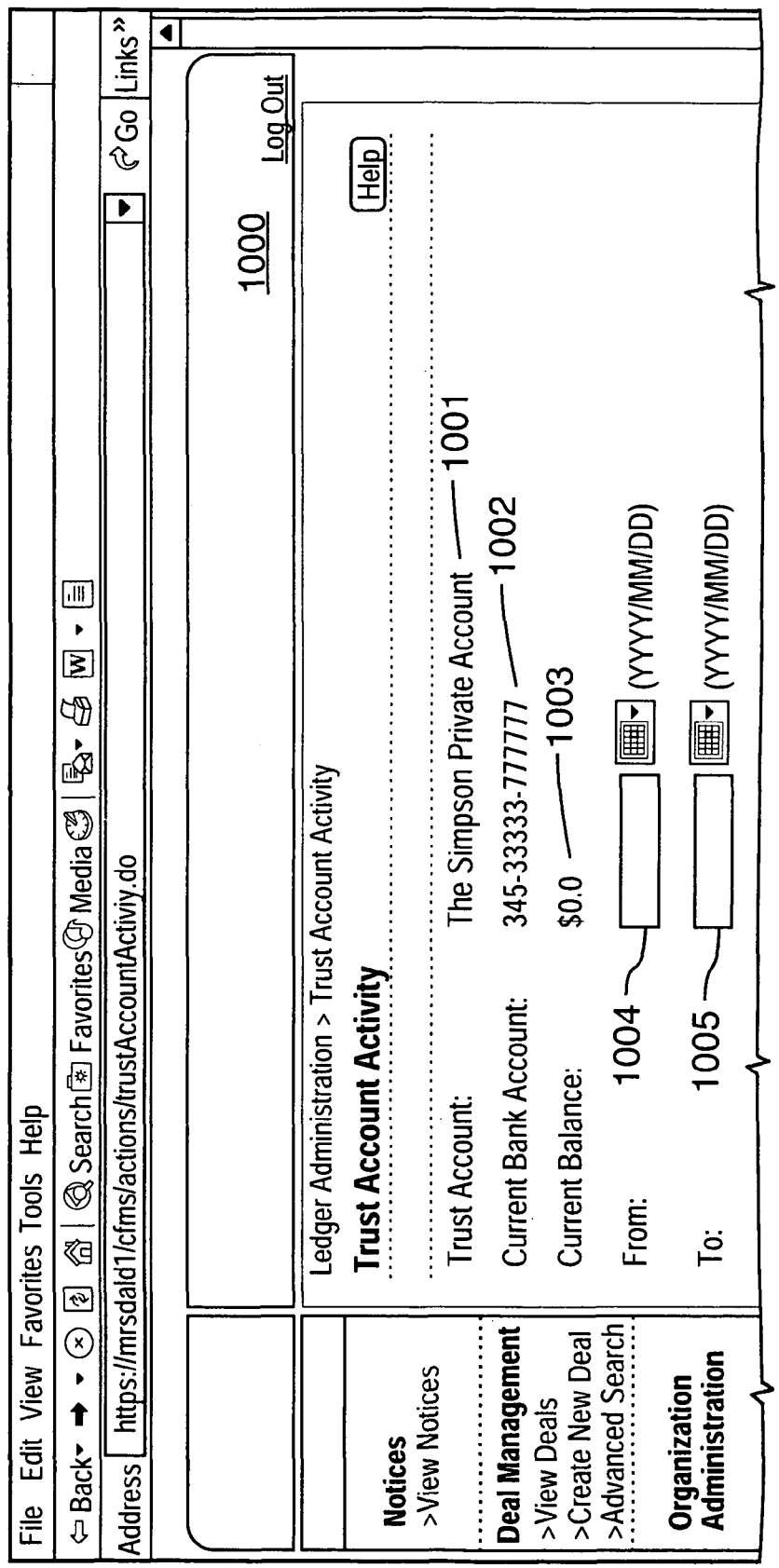
FIG. 10 shows an exemplary screen shot of trust activity.
Figure 10B:
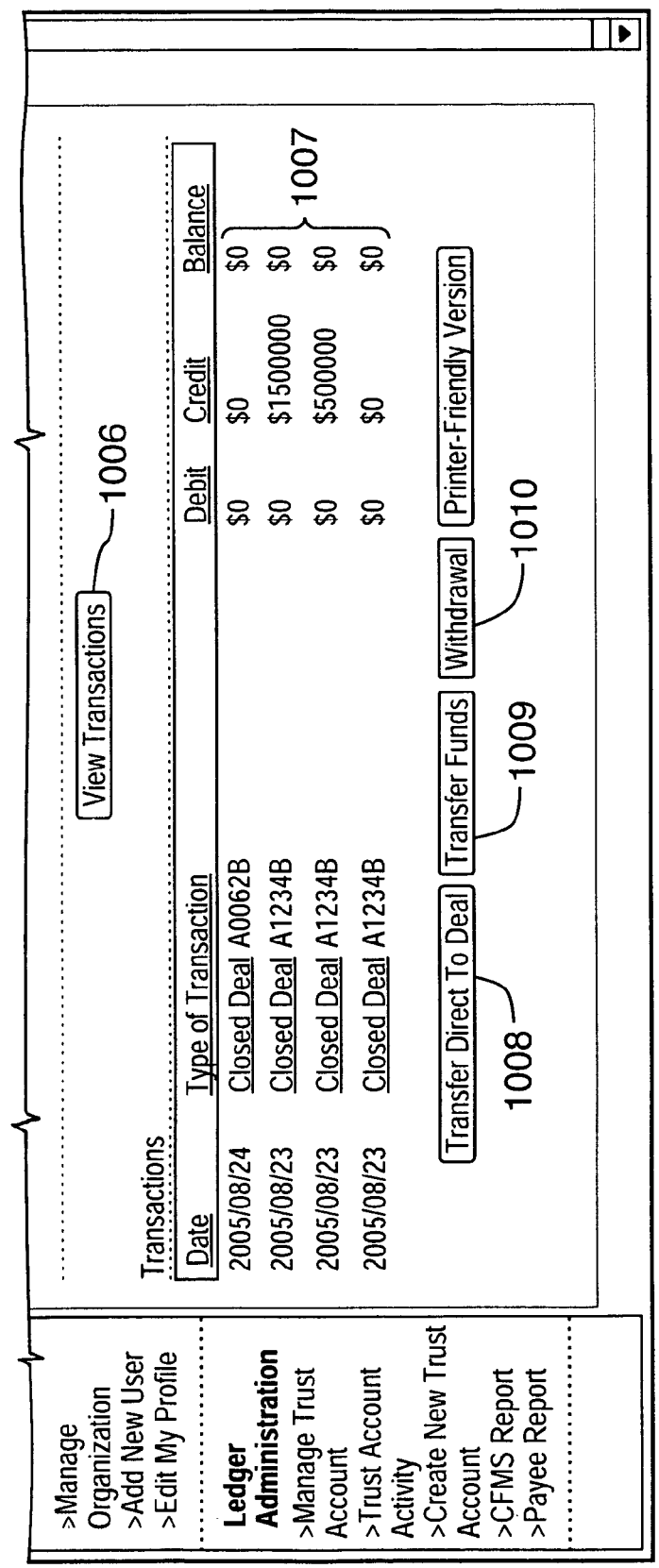

As shown in FIG. 10, lawyers or other registered users who are using the system for multiple deals can also access a type of trust account ledger that summarizes the incoming and outgoing funds from online deals conducted using the system. As shown, the buyer/purchaser's (in this case) bank information is shown at the top of the screen 1001, 1002, 1003. Date parameters can be set for the multiple transactions to view 1004, 1005. The "view transactions" button 1006 is clicked to view the transactions within that date range (or all, if no parameters specified).

As shown in 1007, the summary shows funds incoming and outgoing from the lawyer's closed deals.

"Transfer Funds" allows the user to transfer funds from the organization's general ledger (where unallocated funds are entered) to a specified deal (typically to correct a data error on the electronic record that provides notification of the transfer of funds into the staging account). The "Withdraw" button results in withdrawal of funds out of the staging account and back to the organization's trust account (for example, this would be used by a lawyer to retrieve the proceed of a sale so that they could be given to the seller that the lawyer is representing). Should the method be implemented to provide for a deal to be frozen and the funds to be irrevocable until a pre-determined time, the method would also contain rules to prohibit the withdrawal of funds during the period the funds are 'frozen'.

Figure 11:
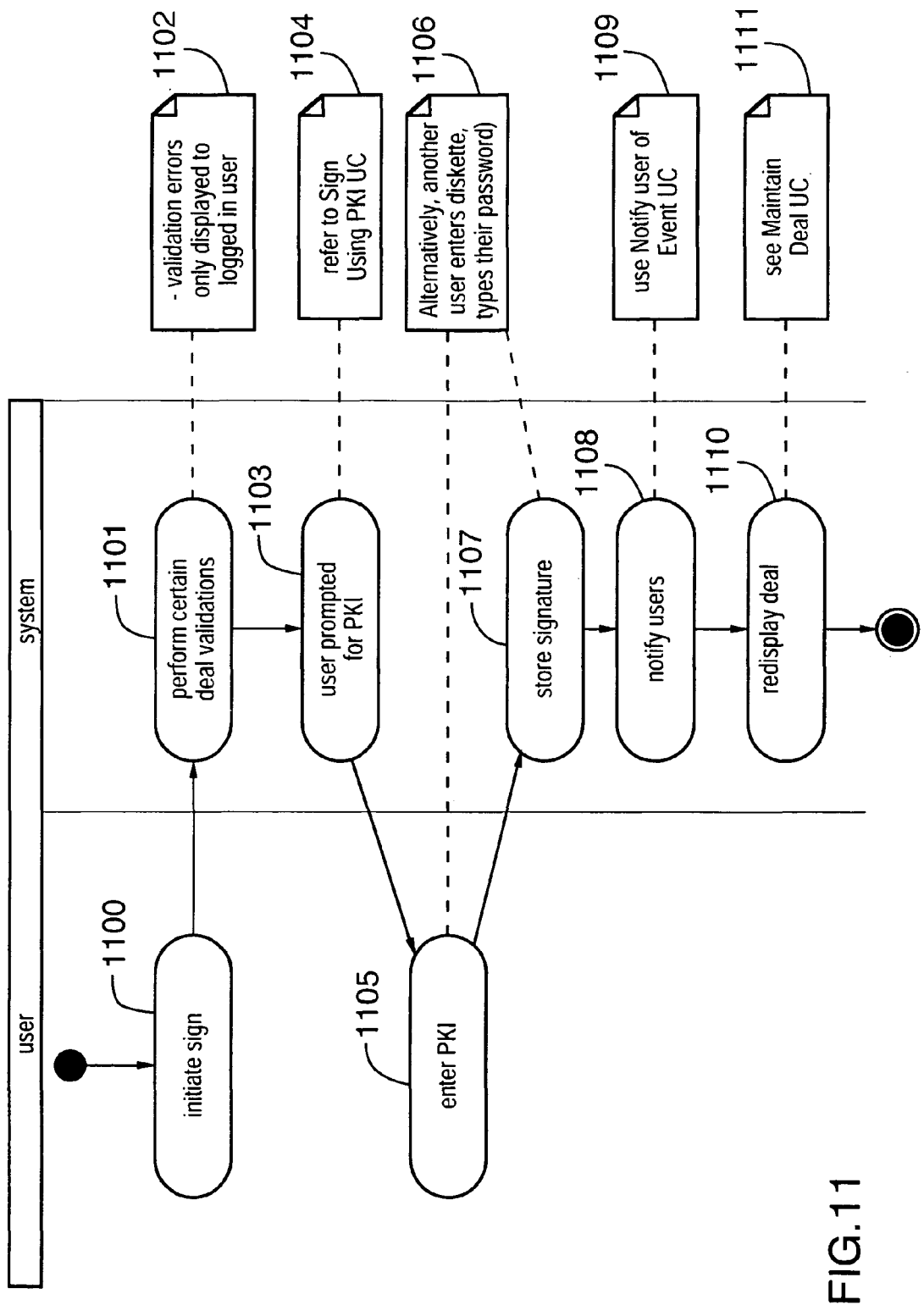
FIG. 11 shows a flow diagram of the deal signature process.

Turning to FIG. 11, the workflow for signoff on a deal is shown. When a user selects to sign a deal 1100, the system may prompt for deal validation information 1101, checked to ensure that the user is properly authorized to signoff on the deal selected. The user is then prompted for his/her digital signature (preferably PKI credentials) 1103, 1004, 1005. This signature is then stored on the system 1107, and the other users that are designated on the deal are notified that the signature has been received 1108, 1109. The deal is then redisplayed as signed 1110, 1111. This process will be required from the vendor and the purchaser sides.

Figure 12:
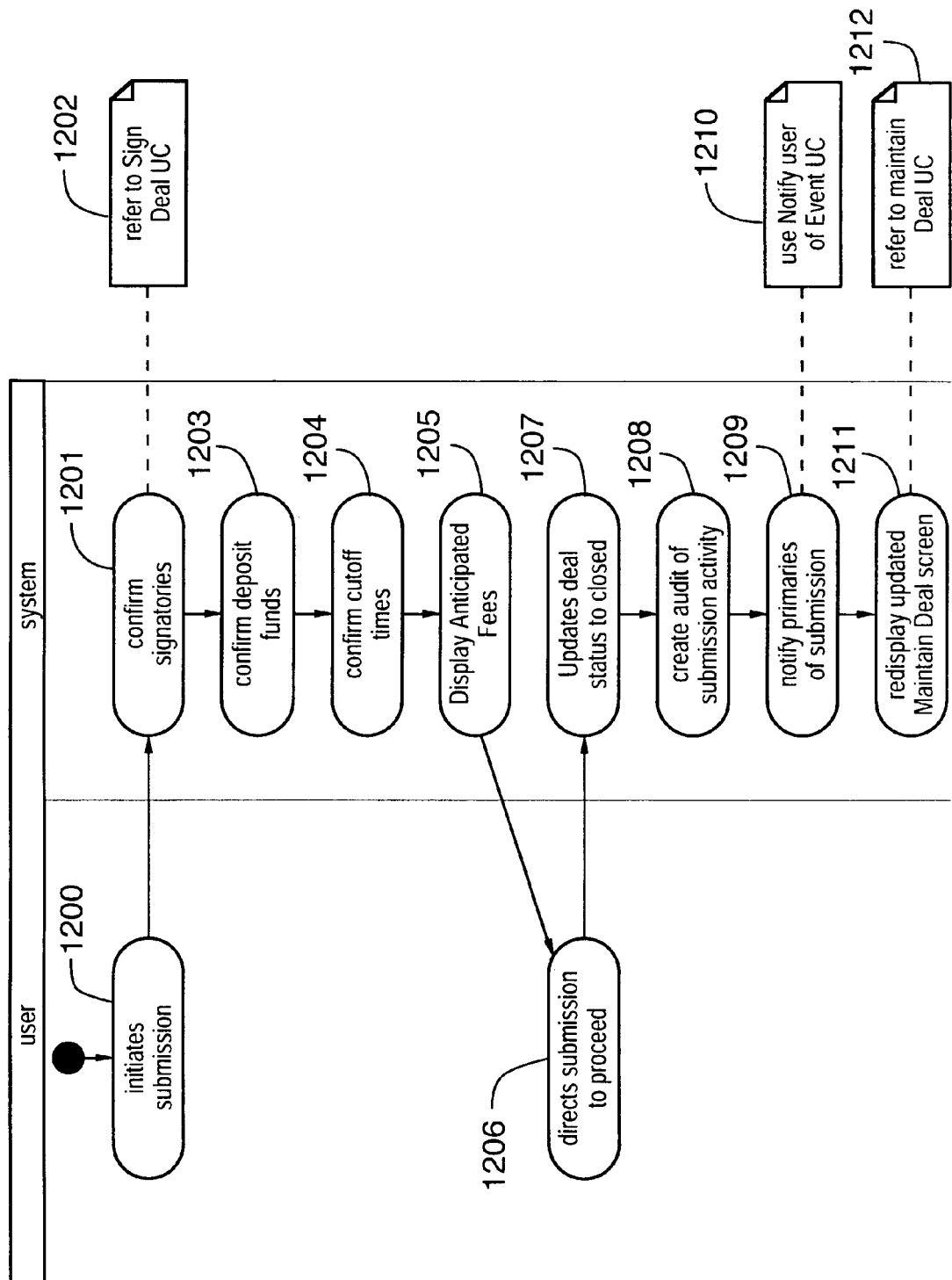
FIG. 12 shows a flow diagram of the deal submission process (payment authorized).

Once the signatures have been received by the system (and these may be received at the same time, or at different times, at the convenience of the parties), the funds closing process may be triggered by the buyer/purchaser 1200. As shown in FIG. 12, the system confirms several things before allowing the buyer/purchaser to authorize release of the closing funds from the staging account: (1) that signatures have been received from the parties 1201, (2) that the funds for the closing have been deposited 1203 (and that the amount deposited is sufficient for the payee amounts designated), and (3) that the fees for utilization of the system are covered by the amount deposited 1205 (these are displayed to the user). Also, bank cutoff times may be checked at 1204. This is in recognition that the banking systems may not operate at all hours, and on all days, which may prevent funds from being transferred the same day. (Depending upon the implementation of the method, if the cut-off time has passed, the method can (i) prevent the deal, (ii) allow the deal to be staged for processing next banking day or (iii) provide the user with the ability to specify the alternative.) The buyer/purchaser can then direct the submission to proceed 1206. Alternately, by means of an API to an external computer system (that manages the transfer of ownership rights to the type of asset being transferred), the direction for the submission to proceed may be invoked electronically so as to coincide with the transfer of ownership rights by the external system. For example, the electronic registration of an ownership transfer in a land registration system could trigger the transfer of the consideration amount from the buyer to the seller.

The system updates the status of the deal to "closed", and an audit trail of the submission activity is created. The primary users for the buyer/purchaser and the seller/vendor are notified that the funds have been released or "submitted" 1209, 1210 and the deal display is updated 1211, 1212.

Figure 13:
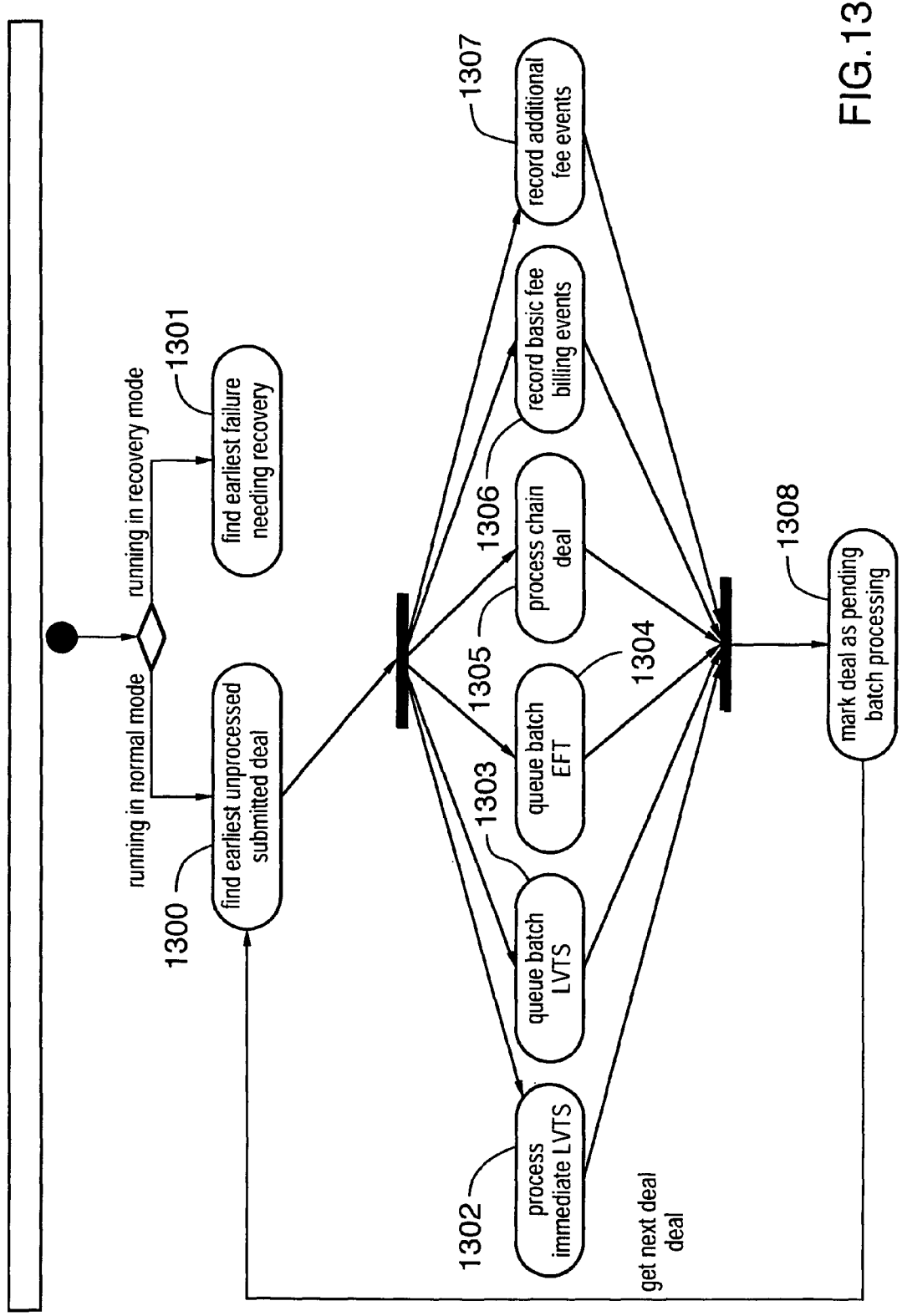
FIG. 13 shows a flow diagram of the deal completion by the system (post-authorization).

As shown in FIG. 13, the system continues to finish the funds processing after submission of the deal by the buyer/purchaser. Some disbursements may be grouped as being for immediate processing via LVTS 1302, others may be batched LVTS 1303 or EFT 1304 (depending on what payment arrangement was agreed to by the parties). Chain deals 1305 are treated separately as the closing funds must be available immediately from a primary deal for a secondary deal. The system also processes fees receivable for billing events and additional fee events 1306, 1307. While these payments are in progress, the parties are informed that the deal is "pending batch processing" 1308. Once the payments have been received by the designated payees, this status is changed to "completed" (not shown). Typically, the time for processing the LVTS payments into a payee account is no more than a few seconds if the funds are being allocated to another deal immediately and in most cases only several minutes in the preferred implementation utilizing LVTS type capabilities. The funds are moved directly into payee accounts, avoiding the need for paper cheques.

The foregoing is considered as illustrative only of the principles of the invention. Further, since numerous modifications and changes will readily occur to those skilled in the art, it is not desired to limit the invention to the exact processes, components and applications shown and described, and accordingly, all suitable modifications and equivalents may be resorted to, falling within the scope of the invention and the appended claims and their equivalents.

While the foregoing is directed to embodiments of the present invention, other and further embodiments of the invention may be devised without departing from the basic scope thereof, and the scope thereof is determined by the claims that follow.

The invention claimed is:

1. Within a closed community of authenticated participants in value transactions, an electronic method of managing a timely and irrevocable transfer of closing funds, the method comprising:
   a. providing an electronic interface accessible over a distributed network for a first party and a second party to enter information for a proposed value transaction between them, wherein the information includes an identification of a plurality of payees, including the first party;
   b. providing access to aspects of the electronic interface by the first party and the second party for modifying the information until agreement can be reached between the first party and the second party on terms of the value transaction, the terms including a closing total, the closing total consisting of amounts payable to each of the plurality of payees;
   c. providing access to a staging account via the electronic interface into which the second party may electronically and irrevocably transfer closing funds representing the closing total from a bank account specified by the second party, the bank account having been pre-verified as a valid bank account by deposit of test funds automatically when a bank account is provided;
   d. providing access to aspects of the electronic interface by the first party and the second party for electronically signaling their final agreement as to the terms of the value transaction;
   e. providing access to aspects of the electronic interface by the second party for electronically directing that the closing funds in the staging account be released;
   f. by signal from the electronic interface, electronically releasing the closing funds to be paid to the payees and electronically transferring in real time the amounts payable from the staging account to a bank account specified by each of the payees, the bank account having been pre-verified as a valid bank account by deposit of test funds automatically when a bank account is provided and prior to the release of the closing funds; and
   g. electronically notifying from the electronic interface at least the second party that the closing funds have been electronically transferred to the payees.

2. The method of claim 1, wherein step (c) further comprises receiving automatic notification from the staging account once the closing funds are available and irrevocable.

3. The method of claim 1, wherein step (g) further comprises notifying each of the payees that a disbursement has been received from the second party with respect to the value transaction.

4. The method of claim 1, wherein the first party and the second party are authenticated participants in the closed community.

5. The method of claim 1, wherein the authenticated participants include lawyers or law firms representing parties in value transactions.

6. The method of claim 1, wherein the authenticated participants include financial institutions.

7. The method of claim 1, wherein the authenticated participants include governments.

8. The method of claim 1, wherein the authenticated participants include utility companies.

9. The method of claim 1, wherein the payees are authenticated participants, but wherein the payees (other than the first party) need not be authenticated participants to receive amounts under the method.

10. The method of claim 1, wherein step (a) of the method further comprises providing access to aspects of the electronic interface by the first party for transmitting an invitation to the second party to access the proposed value transaction information, and wherein the second party's ability to access the proposed value transaction information is contingent on the second party's acceptance of the invitation.

11. The method of claim 1, wherein the funds transfer in step (c) is via secure electronic payment from a bank account of the second party directly to the staging account.

12. The method of claim 1, wherein the funds transfer in step (c) is via wire payment.

13. The method of claim 1, wherein the funds transfer in step (c) is via large-value transaction service (LVTS).

14. The method of claim 1, wherein the funds transfer in step (f) is via secure electronic payment from the staging account to a bank account of the payee.

15. The method of claim 1, wherein the funds transfer in step (f) is via wire payment.

16. The method of claim 1, wherein the funds transfer in step (f) is via large-value transaction service (LVTS).

17. The method of claim 2, wherein the notification to each payee is controlled so as not to disclose sensitive or irrelevant information with respect to the parties or the value transaction.

18. The method of claim 1, wherein the method further includes a step before step (a) of receiving identifying information from the first party and the second party to enroll each of them as participants in the closed community of authenticated participants.

19. The method of claim 18, wherein the enrollment step further includes receiving and verifying authenticating information.

20. The method of claim 18, wherein the enrollment step further includes receiving banking particulars.

21. The method of claim 20, wherein the banking particulars are automatically verified by means of an automatic, electronic transfer of a nominal amount into a bank account designated by the participant seeking enrollment.

22. The method of claim 1, wherein the value transaction is an asset purchase.

23. The method of claim 1, wherein the value transaction is a real estate transaction.

24. The method of claim 1, wherein, at any of steps (a)-(d), the value transaction can be cancelled by either party.

25. The method of claim 1, wherein at step (d), the final agreement is signaled by both parties by electronic signature.

26. The method of claim 1, wherein at step (d), the final agreement is signaled by both parties by secure electronic signature or digital signature.

27. The method of claim 1, wherein the method further comprises providing access to aspects of the electronic interface by a financial institution for monitoring value transactions involving its customers as payee or second party.

28. The method of claim 1, wherein the method is capable of supporting a plurality of value transactions having overlapping times and participants.

29. The method of claim 28, wherein the method includes providing access to aspects of the electronic interface by financial institutions acting on behalf of multiple second parties for electronically transferring funds in bulk to the staging account for step (c) of multiple value transactions, the funds in bulk being separately attributed to individual value transactions awaiting payment.

30. The method of claim 28, wherein the method includes providing access to aspects of the electronic interface by financial institutions acting on behalf of multiple payees for electronically receiving amounts payable under multiple value transactions in bulk from the staging account, the funds in bulk being separately attributed to individual value transactions and amounts payable thereunder.

31. The method of claim 28, wherein the method includes providing access to aspects of the electronic interface by participants in multiple transactions for electronically accessing or receiving reports or statements or ledgers summarizing status and amounts payable or receivable in multiple value transactions.

32. The method of claim 28, wherein the method includes providing access to aspects of the electronic interface by payees payable under multiple transactions for electronically accessing or receiving reports or statements or ledgers summarizing status and amounts receivable in multiple transactions.

33. The method of claim 28, wherein the method is capable of supporting a chain of value transactions in which the second party of a first value transactions is the first party of a second value transaction, and wherein the first value transaction is coordinated so that the funds are available in the staging account to coincide with the second value transaction.

34. The method of claim 1, wherein the method further comprises electronically triggering a closing event coincident with release of the closing funds.

35. The method of claim 34, wherein the closing event comprises registration of a transfer of rights in an asset.

36. The method of claim 34, wherein the closing event comprises electronic registration of an ownership transfer in a land registration system.

* * * * *